US010414463B2

(12) United States Patent
Komatsu et al.

(10) Patent No.: US 10,414,463 B2
(45) Date of Patent: Sep. 17, 2019

(54) BICYCLE OPERATING DEVICE

(71) Applicant: SHIMANO INC., Sakai (JP)

(72) Inventors: Atsushi Komatsu, Sakai (JP);
Takafumi Nishino, Sakai (JP);
Takehiko Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 350 days.

(21) Appl. No.: 15/247,952

(22) Filed: Aug. 26, 2016

(65) Prior Publication Data

US 2018/0057103 A1    Mar. 1, 2018

(51) Int. Cl.
| | |
|---|---|
| *B62L 3/02* | (2006.01) |
| *F15B 7/08* | (2006.01) |
| *B62M 25/08* | (2006.01) |
| *B62K 23/06* | (2006.01) |
| *B62J 99/00* | (2009.01) |

(52) U.S. Cl.
CPC .............. *B62L 3/023* (2013.01); *B62K 23/06* (2013.01); *B62M 25/08* (2013.01); *F15B 7/08* (2013.01); *B62J 2099/004* (2013.01)

(58) Field of Classification Search
CPC ........ B62L 3/023; B62K 23/06; B62M 25/08; F15B 7/08; B62J 2099/004
USPC .................................................... 280/288.4
See application file for complete search history.

(56) References Cited

U.S. PATENT DOCUMENTS

| | | | |
|---|---|---|---|
| 2012/0160625 A1 | 6/2012 | Jordan | |
| 2013/0014607 A1* | 1/2013 | Miki | B62J 99/00 74/501.6 |
| 2013/0031998 A1* | 2/2013 | Miki | B62M 25/04 74/473.12 |
| 2013/0180815 A1* | 7/2013 | Dunlap | B62L 3/023 188/344 |
| 2015/0203169 A1* | 7/2015 | Nishino | B62K 23/06 74/491 |
| 2015/0284049 A1 | 10/2015 | Shipman et al. | |
| 2016/0129966 A1* | 5/2016 | Meggiolan | B62L 3/023 74/491 |
| 2016/0152302 A1* | 6/2016 | Nishino | B62M 25/08 701/2 |
| 2016/0347403 A1* | 12/2016 | Watarai | B62L 3/023 |

* cited by examiner

*Primary Examiner* — Jacob D Knutson
(74) *Attorney, Agent, or Firm* — Mori & Ward, LLP

(57) ABSTRACT

A base member includes a first end to be mounted to a bicycle handlebar and a second end opposite to the first end. An operating member is pivotally coupled to the base member about a first pivot axis. A hydraulic unit is coupled to the operating member to operate a bicycle component in response to an operation of the operating member. An electrical switch is to be activated by an input operation from a user. A wireless communicator is electrically connected to the electrical switch to wirelessly transmit a signal to an additional component in response to the input operation. A power supply is electrically connected to the wireless communicator to supply electrical power to the wireless communicator. At least part of the hydraulic unit is disposed below at least one of the wireless communicator and the power supply in a mounting state of the bicycle operating device.

20 Claims, 13 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, an operating member, a hydraulic unit, an electrical switch, a wireless communicator, and a power supply. The base member includes a first end to be mounted to a bicycle handlebar and a second end opposite to the first end. The operating member is pivotally coupled to the base member about a first pivot axis. The hydraulic unit is coupled to the operating member to operate a bicycle component in response to an operation of the operating member. The electrical switch is to be activated by an input operation from a user. The wireless communicator is electrically connected to the electrical switch to wirelessly transmit a signal to an additional component in response to the input operation. The power supply is electrically connected to the wireless communicator to supply electrical power to the wireless communicator. At least part of the hydraulic unit is disposed below at least one of the wireless communicator and the power supply when viewed from a first direction parallel to the first pivot axis in a mounting state of the bicycle operating device.

With the bicycle operating device according to the first aspect, the at least part of the hydraulic unit and the at least one of the wireless communicator and the power supply are arranged in an up-down direction in the mounting state of the bicycle operating device. Accordingly, an inner space of at least one of the base member and the operating member is effectively utilized.

In accordance with a second aspect of the present invention, a bicycle operating device comprises a base member, an operating member, a hydraulic unit, an electrical switch, a wireless communicator, and a power supply. The base member includes a first end to be mounted to a bicycle handlebar and a second end opposite to the first end. The operating member is pivotally coupled to the base member about a first pivot axis. The operating member has a free end farthest from the first pivot axis viewed from a first direction parallel to the first pivot axis. The hydraulic unit is operatively coupled to the operating member to operate a bicycle component in response to an operation of the operating member. The electrical switch is to be activated by an input operation from a user. The wireless communicator is electrically connected to the electrical switch to wirelessly transmit a signal to an additional component in response to the input operation. The power supply is electrically connected to the wireless communicator to supply electrical power to the wireless communicator. At least part of the hydraulic unit is disposed closer to the free end of the operating member than at least one of the wireless communicator and the power supply when viewed from the first direction.

With the bicycle operating device according to the second aspect, the at least part of the hydraulic unit and the at least one of the wireless communicator and the power supply are arranged in a vertical direction perpendicular to the first direction. Accordingly, an inner space of at least one of the base member and the operating member is effectively utilized.

In accordance with a third aspect of the present invention, a bicycle operating device comprises a base member, an operating member, a hydraulic unit, an electrical switch, a wireless communicator, and a power supply. The base member includes a first end to be mounted to a bicycle handlebar and a second end opposite to the first end. The operating member is pivotally coupled to the base member about a first pivot axis. The operating member has a free end farthest from the first pivot axis when viewed from a first direction parallel to the first pivot axis. The hydraulic unit is coupled to the operating member to operate a bicycle component in response to an operation of the operating member. The hydraulic unit having a hydraulic unit center axis. The hydraulic unit center defines a lower side and an upper side. The lower side includes the free end of the operating member when viewed from the first direction. The upper side is opposite to the lower side with respect to the hydraulic unit center axis when viewed from the first direction. The electrical switch is to be activated by an input operation from a user. The wireless communicator is electrically connected to the electrical switch to wirelessly transmit a signal to an additional component in response to the input operation. The power supply is electrically connected to the wireless communicator to supply electrical power to the wireless communicator. At least one of the wireless communicator and the power supply is disposed in the upper side.

With the bicycle operating device according to the third aspect, the at least one of the wireless communicator and the power supply is disposed in the upper side with respect of the hydraulic unit center axis. Accordingly, an inner space of at least one of the base member and the operating member is effectively utilized.

In accordance with a fourth aspect of the present invention, the bicycle operating device according to any one of the first to third aspects is configured so that the at least part of the hydraulic unit overlaps with the at least one of the wireless communicator and the power supply when viewed from the above in the mounting state of the bicycle operating device.

With the bicycle operating device according to the fourth aspect, the at least part of the hydraulic unit and the at least one of the wireless communicator and the power supply are aligned in the first direction. Accordingly, an inner space of at least one of the base member and the operating member is effectively utilized.

In accordance with a fifth aspect of the present invention, the bicycle operating device according to any one of the first to fourth aspects further comprises a mounting clamp to be coupled to the bicycle handlebar. The mounting clamp has an annular shape. The annular shape has a clamp center axis. The at least part of the hydraulic unit overlaps with the at least one of the wireless communicator and the power supply when viewed from a handle tangential direction parallel to the clamp center axis.

With the bicycle operating device according to the fifth aspect, the at least part of the hydraulic unit and the at least one of the wireless communicator and the power supply are aligned in the first direction. Accordingly, an inner space of at least one of the base member and the operating member is effectively utilized.

In accordance with a sixth aspect of the present invention, the bicycle operating device according to any one of the first to fifth aspects is configured so that the hydraulic unit has a hydraulic unit center axis. The at least part of the hydraulic unit overlaps with the at least one of the wireless communicator and the power supply when viewed from a hydraulic unit based vertical direction perpendicular to the first pivot axis and the hydraulic unit center axis.

With the bicycle operating device according to the sixth aspect, the at least part of the hydraulic unit and the at least one of the wireless communicator and the power supply are aligned in the first direction. Accordingly, an inner space of at least one of the base member and the operating member is effectively utilized.

In accordance with a seventh aspect of the present invention, the bicycle operating device according to any one of the first to sixth aspects is configured so that the hydraulic unit comprises a cylinder bore and a piston movably provided in the cylinder bore.

With the bicycle operating device according to the seventh aspect, the hydraulic unit has a longitudinal shape in a movable direction of the piston. Since at least part of the cylinder bore and the piston is disposed below the at least one of the wireless communicator and the power supply in the mounting state of the bicycle operating device, an inner space of at least one of the base member and the operating member is further effectively utilized.

In accordance with an eighth aspect of the present invention, the bicycle operating device according to any one of the first to sixth aspects is configured so that the hydraulic unit comprises a cylinder bore, a piston movably provided in the cylinder bore, and a reservoir tank connected to the cylinder bore.

With the bicycle operating device according to the eighth aspect, the cylinder bore, the piston, and a reservoir tank require large volume. Since at least part of the cylinder bore, the piston, and the reservoir tank is disposed below the at least one of the wireless communicator and the power supply in the mounting state of the bicycle operating device, an inner space of at least one of the base member and the operating member is further effectively utilized.

In accordance with a ninth aspect of the present invention, the bicycle operating device according to any one of the third and sixth aspects, and the fourth and fifth aspects that are dependent from the third aspect is configured so that the hydraulic unit comprises a cylinder bore and a piston. The cylinder bore has a center axis defining the hydraulic unit center axis. The piston is movably provided in the cylinder bore. The piston is configured to move in a direction in which the hydraulic unit center axis extends.

With the bicycle operating device according to the ninth aspect, the hydraulic unit has a longitudinal shape along the hydraulic unit center axis. Since the at least one of the wireless communicator and the power supply is disposed in the upper side with respect of the hydraulic unit center axis, an inner space of at least one of the base member and the operating member is further effectively utilized.

In accordance with a tenth aspect of the present invention, the bicycle operating device according to any one of the first to ninth aspects is configured so that the at least part of the hydraulic unit is disposed below the first pivot axis when viewed from the first direction in the mounting state of the bicycle operating device.

With the bicycle operating device according to the tenth aspect, an upper space of at least one of the base member and the operating member is largely secured. Accordingly, an inner space of at least one of the base member and the operating member is further effectively utilized.

In accordance with an eleventh aspect of the present invention, the bicycle operating device according to any one of the first to tenth aspects is configured so that the at least part of the hydraulic unit is disposed within the base member.

With the bicycle operating device according to the eleventh aspect, the hydraulic unit requires large volume. Accordingly, it is possible to make the operating member thin. Therefore, a user can easily operate the operating member.

In accordance with a twelfth aspect of the present invention, the bicycle operating device according to any one of the first to tenth aspects is configured so that the at least part of the hydraulic unit is disposed at the operating member.

With the bicycle operating device according to the twelfth aspect, the hydraulic unit requires large volume. Accordingly, it is possible to make the base member thin. Therefore, a user can easily grasp the base member.

In accordance with a thirteenth aspect of the present invention, the bicycle operating device according to any one of the first to twelfth aspects is configured so that the wireless communicator is disposed at the operating member. At least part of the hydraulic unit is disposed below the power supply in the mounting state of the bicycle operating device.

With the bicycle operating device according to the thirteenth aspect, the wireless communicator is disposed at the operating member, which is relatively close to the additional component. Accordingly, wireless communication performance is improved.

In accordance with a fourteenth aspect of the present invention, the bicycle operating device according to any one of the first to thirteenth aspects further comprises an additional operating member movably mounted to the base member. The wireless communicator is disposed at the additional operating member. At least part of the hydraulic unit is disposed below the power supply in the mounting state of the bicycle operating device.

With the bicycle operating device according to the fourteenth aspect, the wireless communicator is disposed at the additional operating member, which is relatively close to the additional component. Accordingly, wireless communication performance is improved. In addition, a user can operate the additional operating member by moving the additional operating member.

In accordance with a fifteenth aspect of the present invention, the bicycle operating device according to the fourteenth aspects is configured so that the additional operating member is movably coupled to the operating member.

With the bicycle operating device according to the fifteenth aspect, a user can operate the additional operating member by a similar operation to an operation of the operating member. Accordingly, operability of the additional operating member is enhanced.

In accordance with a sixteenth aspect of the present invention, the bicycle operating device according to any one of the first to fifteenth aspects is configured so that the bicycle operating device is configured to be mounted on a bicycle having a transverse center plane. The base member includes a first lateral surface and a second lateral surface. The wireless communicator is disposed between the first lateral surface and the second lateral surface in the first direction. The first lateral surface is closer to the wireless communicator than the second lateral surface in the first direction. The first lateral surface is disposed closer to the transverse center plane than the second lateral surface in the first direction.

With the bicycle operating device according to the sixteenth aspect, the wireless communicator is disposed near the first lateral surface facing the transverse center plane. Accordingly, wireless communication is not often interfered by a user's hand. Therefore, wireless communication performance is improved.

In accordance with a seventeenth aspect of the present invention, the bicycle operating device according to any one of the first to sixteenth aspects is configured so that the base member includes a mounting surface at the first end. The mounting surface has a curved shape corresponding to a drop-down handlebar.

With the bicycle operating device according to the seventeenth aspect, it is possible to firmly fix the bicycle operating device to the drop-down handlebar.

In accordance with an eighteenth aspect of the present invention, the bicycle operating device according to any one of the first to seventeenth aspects is configured so that the base member includes a grip portion arranged between the first end and the second end.

With the bicycle operating device according to the eighteenth aspect, the grip portion allows the user to easily operate the operating member.

In accordance with a nineteenth aspect of the present invention, the bicycle operating device according to any one of the first to eighteenth aspects is configured so that the base member includes a pommel portion at the second end.

With the bicycle operating device according to the nineteenth aspect, the pommel portion allows the user to lean on the base member during riding a bicycle.

In accordance with a twentieth aspect of the present invention, the bicycle operating device according to the nineteenth aspects is configured so that at least one of the power supply and the electrical switch is disposed at the pommel portion.

With the bicycle operating device according to the twentieth aspect, a user can easily operate the electrical switch. In addition, it is possible for the electrical switch to generate power when the electrical switch is operated to supply the power to the electrical switch.

In accordance with a twenty-first aspect of the present invention, the bicycle operating device according to any one of the first to twentieth aspects is configured so that at least one of the wireless communicator and the power supply is disposed at the base member.

With the bicycle operating device according to the twenty-first aspect, the number of devices disposed at the operating member can be reduced. Accordingly, it is possible to make the operating member thin. Therefore, a user can easily operate the operating member.

In accordance with a twenty-second aspect of the present invention, the bicycle operating device according to any one of the first to twenty-first aspects further comprises a first pivot shaft pivotally coupling the operating member to the base member about the first pivot axis. The operating member includes a proximal portion connected to the first pivot shaft and a distal portion opposite to the proximal portion in a radial direction around the first pivot axis. At least one of the wireless communicator and the power supply is disposed closer to the proximal portion than to the distal portion.

With the bicycle operating device according to the twenty-second aspect, the at least one of the wireless communicator and the power supply is disposed near the proximal portion. Accordingly, an operating part of the operating member which a user touches and which is near the distal portion can be made thin. Therefore, a user can easily operate the operating member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
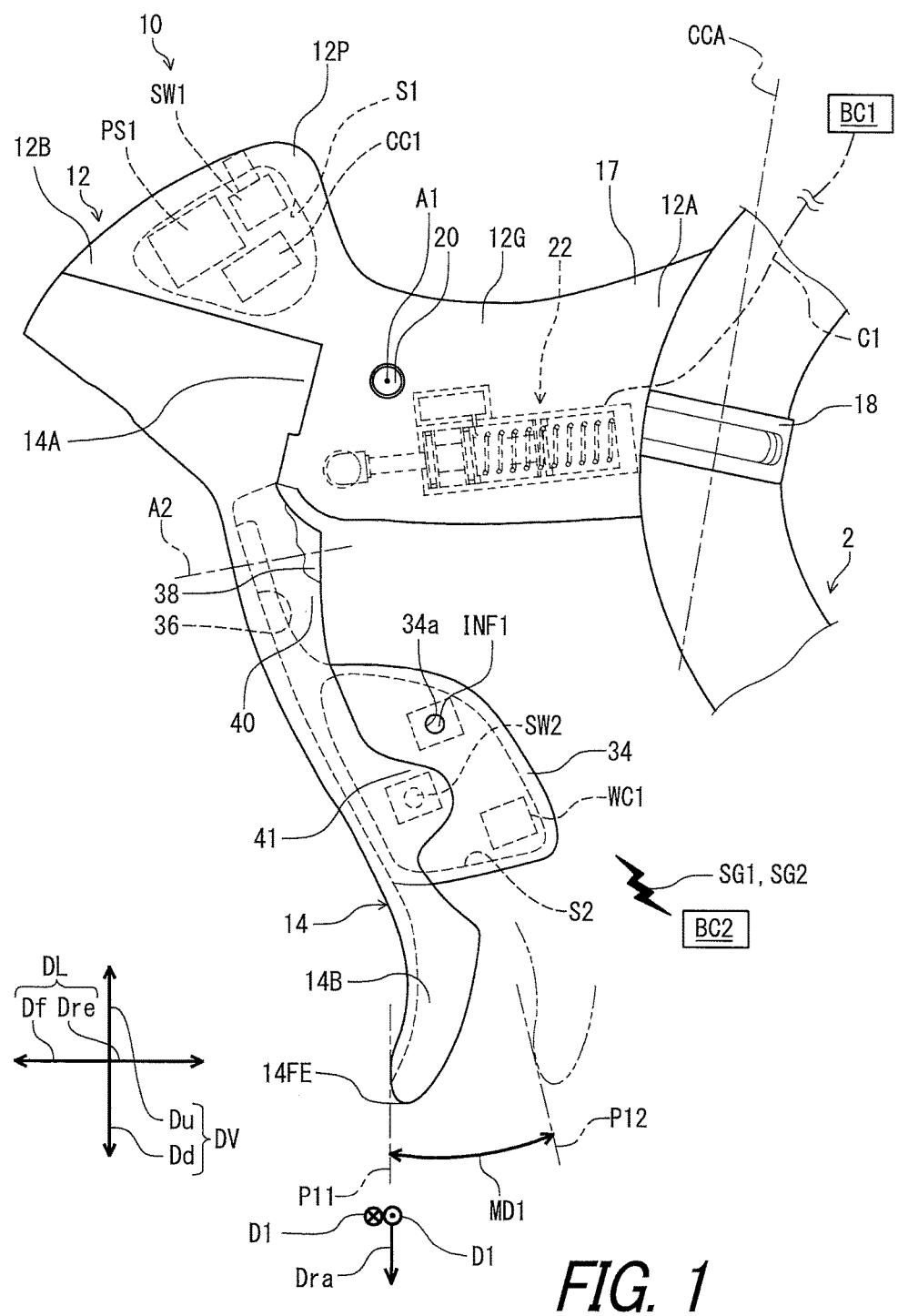
FIG. 1 is a left side elevational view of a bicycle handle provided with a bicycle operating device in accordance with a first embodiment.

The embodiments will now be described with reference to the accompanying drawings, wherein like reference numerals designate corresponding or identical elements throughout the various drawings.

First Embodiment

Figure 2:
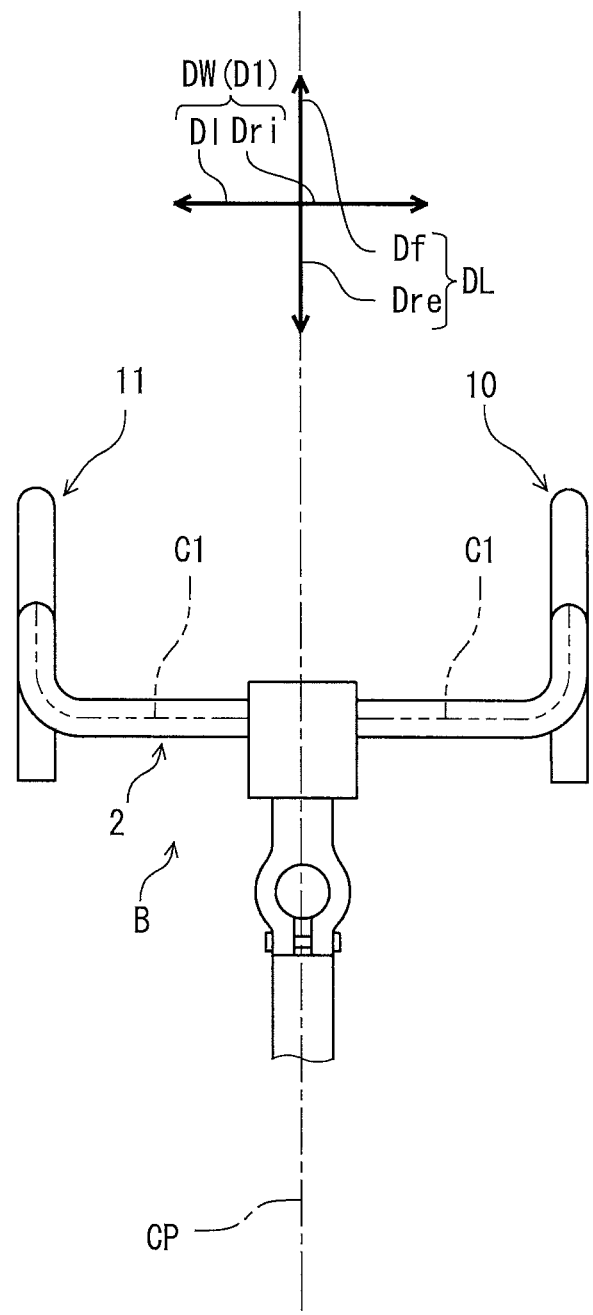
FIG. 2 is a top view of a bicycle operating device illustrated in FIG. 1.

Referring initially to FIGS. 1 and 2, a bicycle operating device 10 in accordance with an embodiment is mounted to a bicycle handlebar 2. In the illustrated embodiment, for example, the bicycle handlebar 2 is a drop-down handlebar. The bicycle handlebar 2 can be referred to as a drop-down handlebar 2. The handlebar 2 can have a shape other than the drop-down handlebar if needed and/or desired. The bicycle operating device 10 is mounted to the bicycle handlebar 2 as a right control device configured to be operated by a rider's right hand. Structures of the bicycle operating device 10 can be applied to a left control device (11 in FIG. 2) configured to be operated by a rider's left hand. The bicycle operating device 10 can be mounted to a bicycle handlebar other than the drop-down handlebar if needed and/or desired.

The bicycle operating device 10 is operatively coupled to a hydraulic bicycle component BC1 such as a hydraulic bicycle brake. In this embodiment, the bicycle operating device 10 is operatively coupled to the hydraulic bicycle component BC1 via a hydraulic hose C1. In this embodiment, the hydraulic bicycle component BC1 can be simply referred to as a bicycle component BC1.

Furthermore, the bicycle operating device 10 is operatively connected to an additional component BC2 via wireless communication. The additional component BC2 includes an electrical bicycle component such as an electric shifting device, an electric suspension, and an electric seatpost. The additional component BC2 may further include a controller to control such electrical bicycle component. The additional component BC2 may further include a digital device (e.g. a cycle computer, a cell phone, or a music player). The additional component BC2 can be also referred to as an electrical bicycle component BC2. In this embodiment, the bicycle operating device 10 is operatively connected to an electric shifting device as the additional component BC2 via wireless communication. The electrical bicycle component BC2 can also be referred to as the electric shifting device BC2. Examples of the electric shifting device BC2 include a derailleur and an internal-gear hub.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle of a bicycle B (FIG. 2) with facing the handlebar 2. Accordingly, these terms, as utilized to describe the bicycle operating device 10, should be interpreted relative to the bicycle B equipped with the bicycle operating device 10 as used in an upright riding position on a horizontal surface. In FIGS. 1 and 2, Df, Dre, Dl, Dri, Du, and Dd indicate a front or forward direction, a rearward direction, a leftward direction, a rightward direction, an upward direction, and a downward direction, respectively. The front or forward direction Df and the rearward direction Dre can be collectively referred to as a longitudinal direction DL. The leftward direction Dl and the rightward direction Dri can be collectively referred to as a lateral direction DW. More specifically, as seen in FIG. 2, the bicycle has a transverse center plane CP extending in the longitudinal direction DL. The transverse center plane CP extends in the middle of the bicycle handlebar 2. Accordingly, the right control device 10 is disposed in a right side with respect to the transverse center plane CP. The left control device 11 is disposed in a left side with respect to the transverse center plane CP. That is, the bicycle operating device 10 is configured to be mounted on the bicycle B having the transverse center plane CP.

Figure 3:
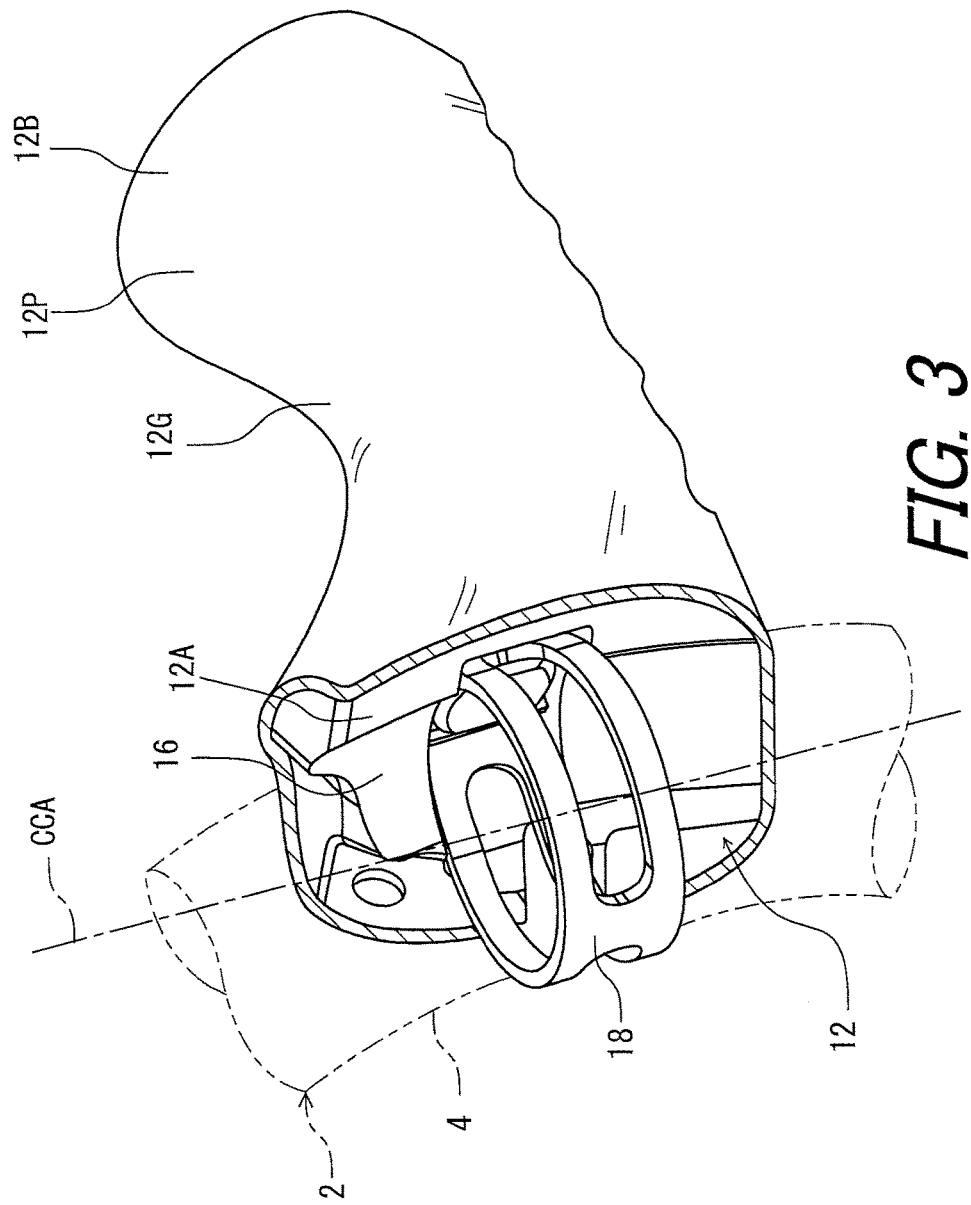
FIG. 3 is a partial perspective view of the bicycle operating device illustrated in FIG. 1.

As seen in FIG. 1, the bicycle operating device 10 comprises a base member 12 and an operating member 14. The base member 12 includes a first end 12A to be mounted to the bicycle handlebar 2 and a second end 12B opposite to the first end 12A. The first end 12A is configured to be coupled to the bicycle handlebar 2 in a mounting state of the bicycle operating device 10. The mounting state of the bicycle operating device 10 means a state where the bicycle operating device 10 is mounted to the bicycle handlebar 2. As seen in FIG. 3, the drop-down handlebar 2 includes a curved part 4. The base member 12 includes a mounting surface 16 at the first end 12A. The mounting surface 16 has a curved shape corresponding to the drop-down handlebar 2. Specifically, the mounting surface 16 has the curved shape corresponding to an outer peripheral surface of the curved part 4 of the bicycle handlebar 2. The bicycle operating device 10 further comprises a mounting clamp 18 to be coupled to the bicycle handlebar 2. The mounting clamp 18 has an annular shape. The annular shape has a clamp center axis CCA.

As seen in FIGS. 1 and 3, the base member 12 includes a grip portion 12G arranged between the first end 12A and the second end 12B. The grip portion 12G is configured to be gripped by a user. That is, the base member 12 has a graspable shape between the first end 12A and the second end 12B. The base member 12 includes a pommel portion 12P at the second end 12B. The pommel portion 12P extends obliquely upward from the grip portion 12G. The pommel portion 12P is disposed at a position higher than a highest position of the first end 12A in the mounting state of the bicycle operating device 10.

Figure 4:
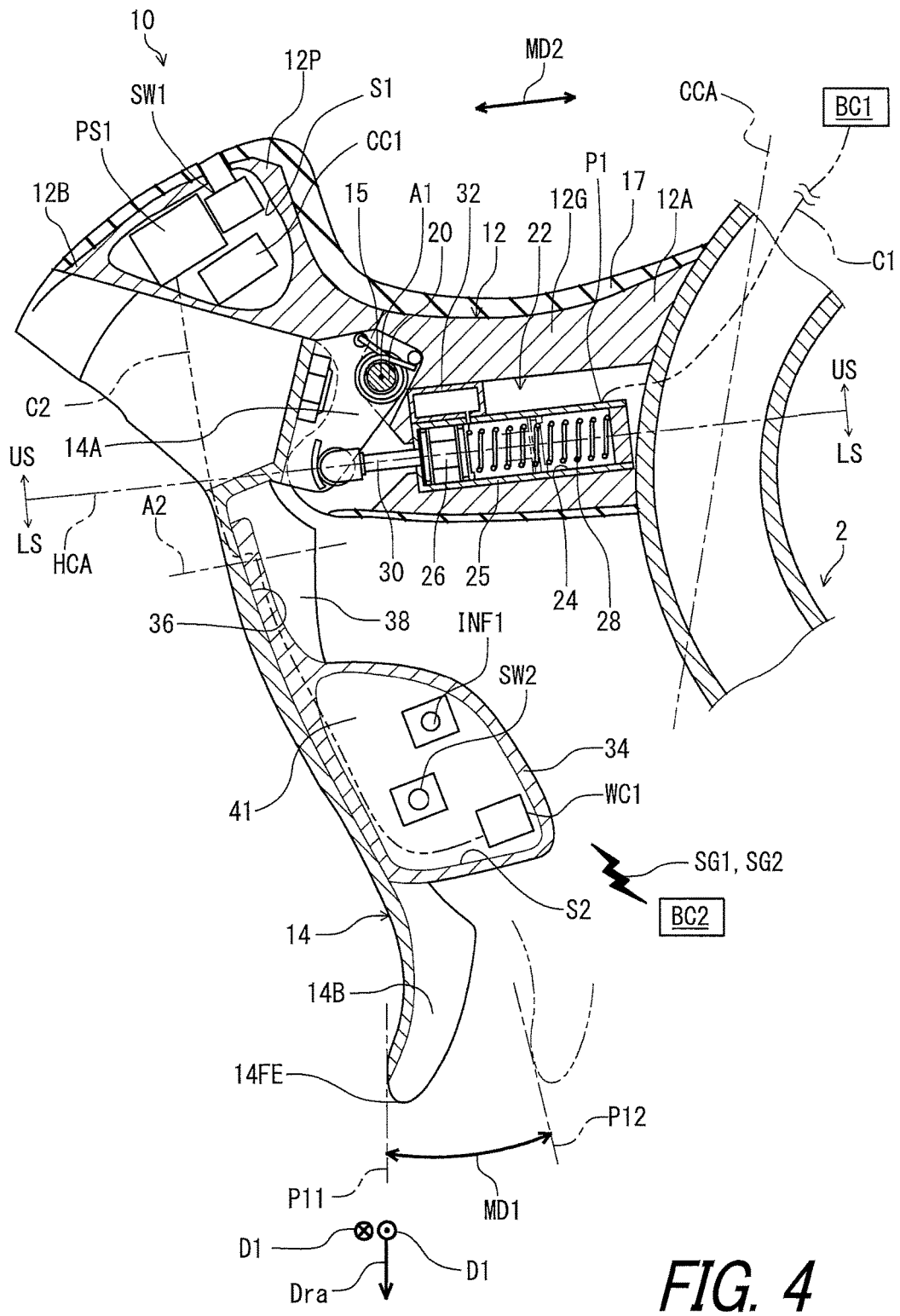
FIG. 4 is a cross-sectional view of the bicycle operating device illustrated in FIG. 1.

As seen in FIGS. 1 and 4, the bicycle operating device 10 may include a cover 17. The cover 17 is configured to at least partially cover the base member 12. For example, the cover 17 is made of a non-metallic material such as rubber, and the base member 12 is made of a metallic material. The base member 12 can be made of a non-metallic material if needed and/or desired. The cover 17 can be omitted from the bicycle operating device 10 if needed and/or desired.

In this embodiment, the operating member 14 is a brake operating member, for example. As seen in FIG. 1, the operating member 14 is pivotally coupled to the base member 12 about a first pivot axis A1. Specifically, the bicycle operating device 10 further comprises a first pivot shaft 20 pivotally coupling the operating member 14 to the base member 12 about the first pivot axis A1. The first pivot shaft 20 defines the first pivot axis A1. The first pivot shaft 20 is supported by the base member 12. The first pivot shaft 20 is arranged below pommel portion 12P in the mounting state of the bicycle operating device 10.

In this embodiment, the operating member 14 downwardly extends from the base member 12 in the mounting state of the bicycle operating device 10. The operating member 14 is rotatable relative to the base member 12 about the first pivot axis A1 in a first movable direction MD1. In this embodiment, the first movable direction MD1 is a circumferential direction defined about the first pivot axis A1. The operating member 14 is rotatable relative to the base member 12 between a rest position P11 and an operated position P12. The bicycle operating device 10 may further comprise a first biasing member 15 to bias the operating member 14 toward the rest position P11.

In the present application, the term "rest position" as used herein refers to a position at which a movable part such as the operating member 14 remains stationary in a state where the movable part is not operated by a user. The term "operated position" as used herein refers to a position at which the movable part has been operated by a user to perform the operation of the bicycle component.

As seen in FIG. 4, the operating member 14 includes a proximal portion 14A and a distal portion 14B. The proximal portion 14A is connected to the first pivot shaft 20. That is the proximal portion 14A is pivotally coupled to the base member 12. The distal portion 14B is opposite to the proximal portion 14A in a radial direction Dra around the first pivot axis A1. The operating member 14 has a free end 14FE farthest from the first pivot axis A1 viewed from a first direction D1 parallel to the first pivot axis A1.

As seen in FIG. 4, the bicycle operating device 10 comprises a hydraulic unit 22. The hydraulic unit 22 is coupled to the operating member 14 to operate the bicycle component BC1 in response to an operation of the operating member 14.

The hydraulic unit 22 comprises a cylinder bore 24 and a piston 26. In this embodiment, the cylinder bore 24 is defined by a hydraulic cylinder 25 provided in the base member 12, and the hydraulic cylinder 25 is a different member from the base member 12. That is, at least part of the hydraulic unit 22 is disposed within the base member 12. However, the cylinder bore 24 may be shaped as a hole in the base member 12. The cylinder bore 24 has a center axis HCA defining a hydraulic unit center axis. That is, the hydraulic unit 22 has the hydraulic unit center axis HCA. The piston 26 is movably provided in the cylinder bore 24. The piston 26 is configured to move in a direction MD2 (a second movable direction MD2) in which the hydraulic unit center axis HCA extends. In this embodiment, the hydraulic unit center axis HCA defines a lower side LS and an upper side US. The lower side LS includes the free end 14FE of the operating member 14 when viewed from the first direction D1. The upper side US is opposite to the lower side LS with respect to the hydraulic unit center axis HCA when viewed from the first direction D1.

In the illustrated embodiment, at least one of the cylinder bore 24 and the piston 26 is at least partly disposed closer to the first end 12A than the first pivot axis A1 when viewed from the first direction D1. More specifically, at least one of a whole of the cylinder bore 24 and a whole of the piston 26 is disposed closer to the first end 12A than the first pivot axis A1 when viewed from the first direction D1. An outlet port P1 of the hydraulic unit 22 is closer to the first end 12A than the piston 26.

Further, the hydraulic unit 22 may comprise a piston biasing member 28 provided in the cylinder bore 24 to bias the piston 26. The piston 26 is operatively coupled to the operating member 14 via a connecting rod 30. The piston biasing member 28 is configured to bias the operating member 14 via the piston 26 and the connecting rod 30 toward the rest position P11.

The hydraulic unit 22 comprises a reservoir tank 32 connected to the cylinder bore 24. In this embodiment, the reservoir tank 32 is disposed in the upper side US when viewed from the first direction D1. However, the reservoir tank 32 may be disposed in the lower side LS when viewed from the first direction D1. The reservoir tank 32 is configured to be in fluid communication with the cylinder bore 24. The cylinder bore 24 is configured to be in fluid communication with the hydraulic bicycle component BC1 via the hydraulic hose C1. When the operating member 14 is pivoted relative to the base member 12 about the first pivot axis A1 toward an operated position P12, the hydraulic pressure is applied to hydraulic bicycle component BC1 via the hydraulic hose C1 to actuate the hydraulic bicycle component BC1. In this embodiment, the hydraulic hose C1 is not a part of the hydraulic unit 22.

In this embodiment, the first pivot axis A1 is disposed in the upper side US when viewed from the first direction D1. Therefore, at least part of the hydraulic unit 22 is disposed below the first pivot axis A1 when viewed from the first direction D1 in the mounting state of the bicycle operating device 10. Specifically, at least one of a whole of the cylinder bore 24, a whole of the piston 26, and a whole of the reservoir tank 32 is disposed below the first pivot axis A1 when viewed from the first direction D1 in the mounting state of the bicycle operating device 10. More specifically, the whole of the cylinder bore 24, the whole of the piston 26, and the whole of the reservoir tank 32 are disposed below the first pivot axis A1 when viewed from the first direction D1 in the mounting state of the bicycle operating device 10.

Further, at least part of the hydraulic unit 22 is disposed closer to the first end 12A than the first pivot axis A1 when viewed from the first direction D1 parallel to the first pivot axis A1. Specifically, at least one of the cylinder bore 24, the piston 26, and the reservoir tank 32 is at least partly disposed closer to the first end 12A than the first pivot axis A1 when viewed from the first direction D1. More specifically, at least one of the whole of the cylinder bore 24, the whole of the piston 26, and the whole of the reservoir tank 32 is disposed closer to the first end 12A than the first pivot axis A1 when viewed from the first direction D1.

Figure 5:
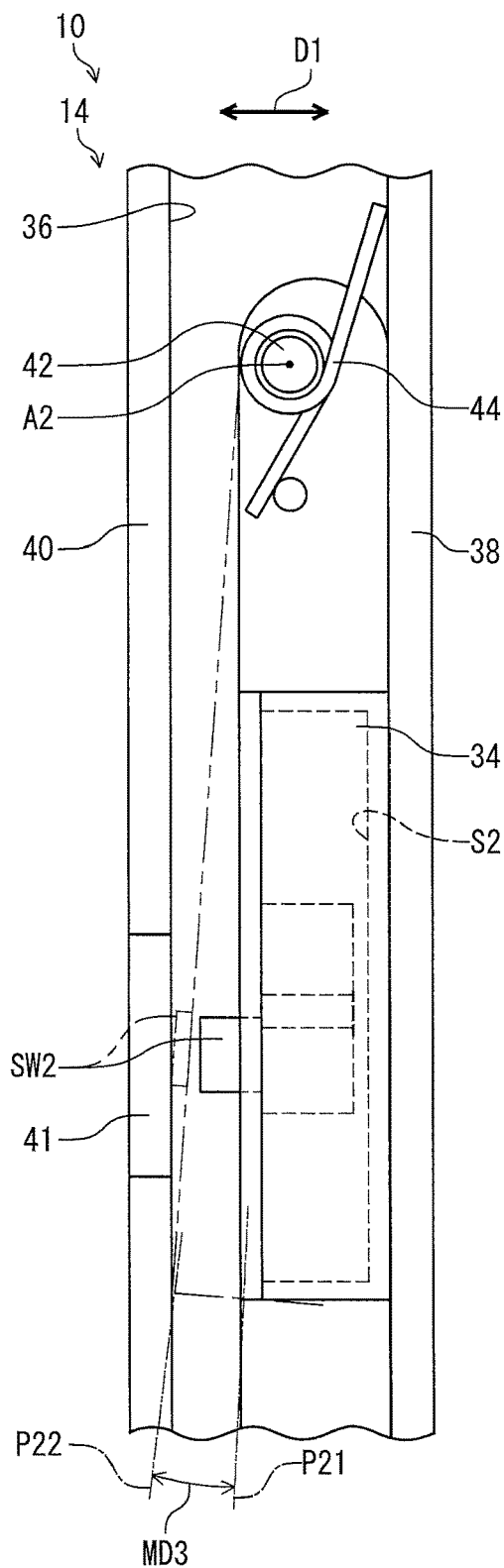
FIG. 5 is a partial rear elevational view of the operating device illustrated in FIG. 1.

As seen in FIGS. 1, 4, and 5, the bicycle operating device 10 further comprises an additional operating member 34 movably mounted to the base member 12. The additional operating member 34 is configured to receive an input operation from a user. That is, the additional operating member 34 is configured to be operated by a user. The additional operating member 34 is movable relative to the operating member 14. In the illustrated embodiment, the additional operating member 34 is movably coupled to the operating member 14. The additional operating member 34 is pivotally mounted on the operating member 14 about a second pivot axis A2 which is non-parallel to the first pivot axis A1. As seen in FIG. 5, the additional operating member 34 is rotatable relative to the operating member 14 about the second pivot axis A2 in a third movable direction MD3. In this embodiment, the third movable direction MD3 is a circumferential direction defined about the second pivot axis A2. The additional operating member 34 is rotatable relative to the operating member 14 between a rest position P21 and an operated position P22.

The additional operating member 34 comprises a resin material, for example. The additional operating member 34 can selectively include carbon fiber and other reinforcement materials in addition to the resin material. In other words, the additional operating member 34 can be made of a carbon fiber reinforced plastic and so on. However, the additional operating member 34 can be made of other materials if needed and/or desired.

As seen in FIGS. 1, 4, and 5, the operating member 14 includes a cavity 36 in which the additional operating member 34 is at least partially provided. The cavity 36 extends between the proximal portion 14A and the distal portion 14B. The additional operating member 34 is disposed between the proximal portion 14A and the distal portion 14B. As seen in FIG. 5, the operating member 14 includes a first side wall 38 and a second side wall 40 which are spaced apart from each other. The first side wall 38 and the second side wall 40 extends between the proximal portion 14A and the distal portion 14B. The cavity 36 is defined between the first side wall 38 and the second side wall 40. The additional operating member 34 is at least partially provided between the first side wall 38 and the second side wall 40.

The bicycle operating device 10 includes a pivot pin 42 and a second biasing member 44. The pivot pin 42 defines the second pivot axis A2. The pivot pin 42 is secured to the operating member 14. The additional operating member 34 is pivotally mounted to the operating member 14 via the pivot pin 42. The second biasing member 44 is configured to bias the additional operating member 34 toward the first side wall 38. The first side wall 38 is configured to position the additional operating member 34 at the rest position P21.

As seen in FIGS. 1, 4, and 5, the bicycle operating device 10 comprises an electrical switch to be activated by an input operation from a user. In the illustrated embodiment, the bicycle operating device 10 includes a first electrical switch SW1 and a second electrical switch SW2. However, one of the first electrical switch SW1 and the second electrical switch SW2 can be omitted from the bicycle operating device 10 if needed and/or desired. The first electrical switch SW1 and the second electrical switch SW2 can be also referred to as an electrical switch SW1 and an electrical switch SW2, respectively. As seen in FIG. 4, the electrical switch SW1 is disposed in a first internal space S1 of the base member 12 at the pommel portion 12P. That is, the electrical switch SW1 is disposed at the pommel portion 12P. The electrical switch SW2 is disposed in a second internal space S2 of the additional operating member 34. Accordingly, the electrical switch SW1 is disposed at the base member 12, and the electrical switch SW2 is disposed at the additional operating member 34.

From another point of view, the electrical switch SW1 is disposed in the upper side US, and the electrical switch SW2 is disposed in the lower side LS. The electrical switch SW1 is disposed closer to the proximal portion 14A than to the distal portion 14B, and the electrical switch SW2 is disposed closer to the distal portion 14B than to the proximal portion 14A. However, the first electrical switch SW1 and the second electrical switch SW2 may be disposed at different places from the pommel portion 12P and the additional operating member 34. Other possible positions are described in the modifications of this embodiment.

The electrical switches SW1 and SW2 are configured to be operated by a user. Specifically, as seen in FIG. 4, a button or a switching member of the first electrical switch SW1 protrudes from the base member 12. A user can operate the first electrical switch SW1 by pushing the button of the first electrical switch SW1 or shifting the switching member of the first electrical switch SW1. Pushing the button of the first electrical switch SW1 or shifting the switching member of the first electrical switch SW1 can be referred to as a first input operation. The first electrical switch SW1 is configured to receive the first input operation from the user to generate a first control signal SG1 in response to the first input operation.

Regarding the second electrical switch SW2, as seen in FIGS. 1 and 5, the operating member 14 includes a receiving portion 41 provided on the second side wall 40. The receiving portion 41 extends from the second side wall 40. As seen in FIG. 1, the electrical switch SW2 overlaps with the receiving portion 41 when viewed from the first direction D1. As seen in FIG. 5, a button of the second electrical switch SW2 protrudes from the additional operating member 34. That is, the electrical switch SW2 is disposed to face the receiving portion 41 in the first direction D1.

As seen in FIG. 5, when the additional operating member 34 is pushed toward the second side wall 40 by a user, the additional operating member 34 pivots relative to the operating member 14 about the second pivot axis A2 toward the operated position P22. Such pivotal movement of the additional operating member 34 relative to the operating member 14 can be referred to as a second input operation. The electrical switch SW2 is configured to be activated by the receiving portion 41 of the operating member 14 in response to the second input operation. The second electrical switch SW2 is configured to receive the second input operation from a user to generate a second control signal SG2 in response to the second input operation.

As seen in FIGS. 1 and 4, the bicycle operating device 10 comprises a wireless communicator WC1. In the illustrated embodiment, the bicycle operating device 10 comprises a single wireless communicator WC1. However, the bicycle operating device 10 may comprise a plurality of wireless communicators. The wireless communicator WC1 is disposed at the additional operating member 34. Specifically, the wireless communicator WC1 is disposed in the second internal space S2 of the additional operating member 34. In the illustrated embodiment, the wireless communicator WC1 is disposed in the additional operating member 34, but the wireless communicator WC1 may be disposed on the additional operating member 34. Further, the wireless communicator WC1 is disposed closer to the distal portion 14B than to the proximal portion 14A. However, the wireless communicator WC1 may be disposed at a different place from the additional operating member 34. Other possible positions are described in the modifications of this embodiment.

The wireless communicator WC1 is electrically connected to the electrical switch SW1 to wirelessly transmit a signal (e.g. the first control signal SG1) to the additional component BC2 in response to an input operation (e.g. the first input operation described above). The wireless communicator WC1 is electrically connected to the electrical switch SW2 to wirelessly transmit a signal (e.g. the second control signal SG2) to the additional component BC2 in response to an input operation (e.g. the second input operation described above).

Further, the wireless communicator WC1 may receive a signal from the additional component BC2 regarding a status of the additional component (e.g. a communication state and a current gear stage etc.) to be forwarded to an informing device which is described hereinafter.

The wireless communicator WC1 may include a directional wireless antenna (not shown) to more strongly output a wireless signal in a specific direction than other directions. That is, the wireless communicator WC1 is configured to wirelessly transmit a directional signal to the additional component BC2 in response to the input operation. However, the wireless communicator WC1 can be configured to wirelessly transmit a signal which does not have directional characteristics if needed and/or desired.

As seen in FIGS. 1 and 4, the bicycle operating device 10 may further comprise an informing device INF1. In the illustrated embodiment, the bicycle operating device 10 further comprises a single informing device INF1. However, the bicycle operating device 10 may comprise a plurality of informing devices. Further, the informing device INF1 may be omitted. In the illustrated embodiment, the informing device INF1 is disposed at the additional operating member 34. Specifically, the informing device INF1 is disposed in the second internal space S2 of the additional operating member 34. However, the informing device INF1 may disposed on the additional operating member 34. Further, the informing device INF1 may be disposed at a different place from the additional operating member 34. Other possible positions are described in the modifications of this embodiment.

The informing device INF1 may be configured to inform a user of a state of the bicycle operating device 10. Alternatively or additionally, the informing device INF1 may be configured to inform a user of a pairing mode between the bicycle operating device 10 and the additional component BC2. Further, the informing device INF1 may be configured to inform another information such as a current gear stage. As seen in FIG. 1, the informing device INF1 is exposed from a through-hole 34a provided on the additional operating member 34, and the informing device INF1 includes a light emitting diode (LED) configured to emit light through the through-hole 34a in accordance with the state of the bicycle operating device 10 and the pairing mode and the like. The wireless communicator WC1, the electrical switch SW2, and the informing device INF1 may be provided on a substrate (not shown) secured to the additional operating member 34 in the second internal space S2, for example.

As seen in FIGS. 1 and 4, the bicycle operating device 10 further comprises a communication controller CC1. In the illustrated embodiment, the bicycle operating device 10 further comprises a single communication controller CC1. However, the bicycle operating device 10 may comprise a plurality of communication controllers. In the illustrated embodiment, the communication controller CC1 is disposed at the pommel portion 12P. However, the communication controller CC1 may be disposed at a different place from the pommel portion 12P. Other possible positions are described in the modifications of this embodiment.

The communication controller CC1 is configured to control the wireless communicator WC1 to wirelessly transmit the signal SG1 (SG2) to the additional component BC2 in response to the input operation to the electrical switch SW1 (SW2). For example, the communication controller CC1 is electrically connected to each of the first electrical switch SW1, the second electrical switch SW2, the wireless communicator WC1, and the informing device INF1. The electrical switches SW1 and SW2 are electrically connected to the wireless communicator WC1 via the communication controller CC1.

In the illustrated embodiment, the communication controller CC1 controls the wireless communicator WC1 to wirelessly transmit the first control signal SG1 to the additional component BC2 when the first electrical switch SW1 is activated in response to the first input operation from the user. Specifically, the communication controller CC1 is configured to detect the activation of the first electrical switch SW1. Then, the communication controller CC1 is configured to generate the first control signal SG1 in response to the activation of the electrical switch SW1. The wireless communicator WC1 is configured to superimpose the first control signal SG1 on carrier wave using a predetermined wireless communication protocol to generate wireless signals.

The communication controller CC1 controls the wireless communicator WC1 to wirelessly transmit the second control signal SG2 to the additional component BC2 when the electrical switch SW2 is activated in response to the second input operation from the user. Specifically, the communication controller CC1 is configured to detect the activation of the second electrical switch SW2. Then, the communication controller CC1 is configured to generate the second control signal SG2 in response to the activation of the second electrical switch SW2. The wireless communicator WC1 is configured to superimpose the second control signal SG2 on carrier wave using a predetermined wireless communication protocol to generate wireless signals.

Figure 6:
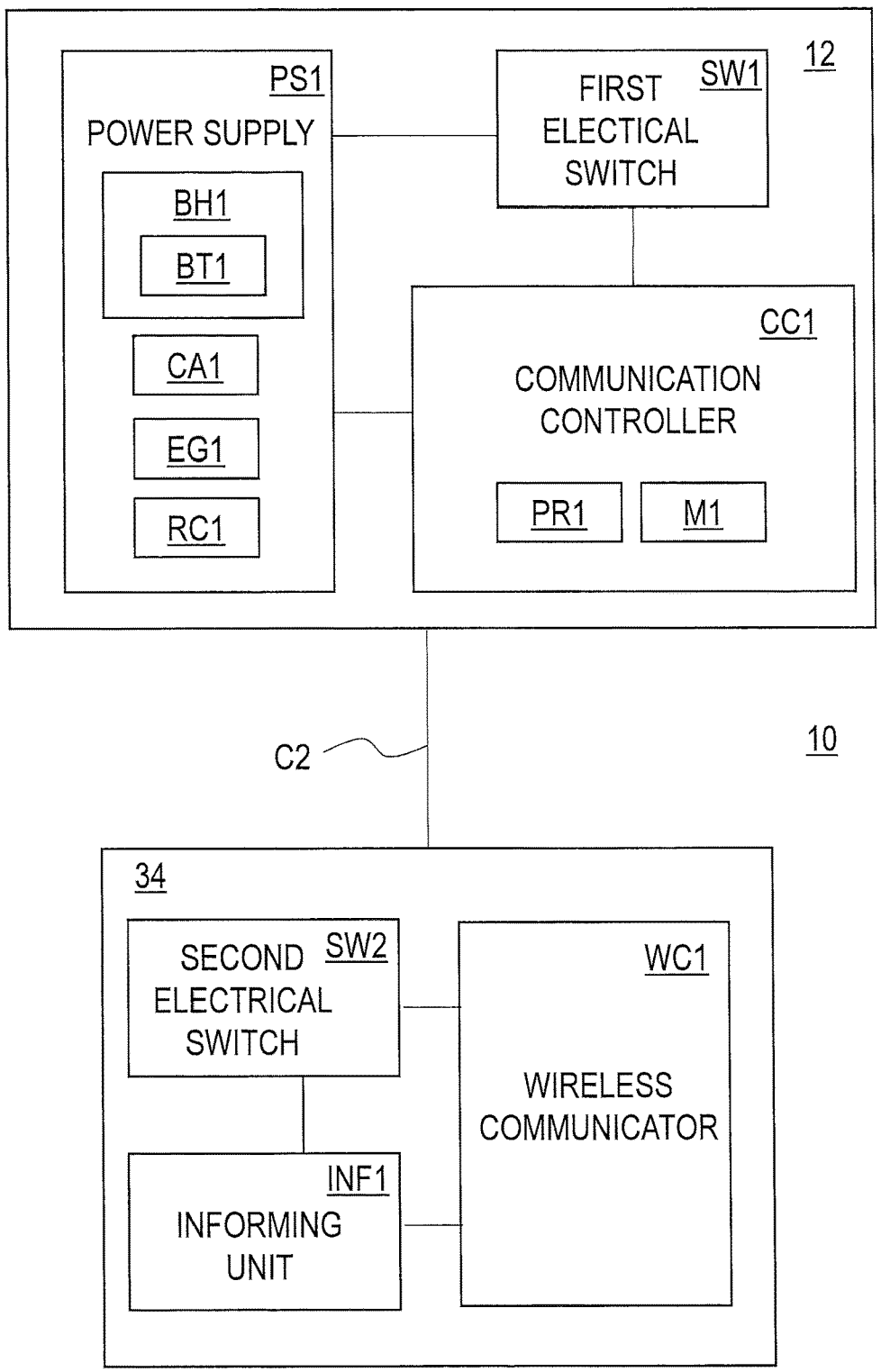
FIG. 6 is a schematic block diagram of the bicycle operating device illustrated in FIG. 1.

As seen in FIG. 6, the communication controller CC1 is constituted as a microcomputer and includes a processor PR1 and a memory M1. The processor PR1 includes a central processing unit (CPU). The memory M1 includes a read only memory (ROM) and a random access memory (RAM). For example, a program stored in the memory M1 is read into the processor PR1, and thereby functions of the communication controller CC1 are performed.

The first electrical switch SW1 may be a function switch. The communication controller CC1 is configured to enter a setting mode for an initial setting and/or programming when the function switch SW1 is operated by the user.

As seen in FIGS. 1, 4, and 6, the bicycle operating device 10 comprises a power supply PS1. In the illustrated embodiment, the bicycle operating device 10 comprises a single power supply PS1. However, the bicycle operating device 10 may comprise a plurality of power supplies. In the illustrated embodiment, the power supply PS1 is disposed at the pommel portion 12P. In other words, the power supply PS1 is disposed in the upper side US. Further, the power supply PS1 is disposed at the base member 12. The power supply PS1 is disposed closer to the proximal portion 14A than to the distal portion 14B. Accordingly, at least one of the power supply PS1 and the electrical switch SW1 is disposed at the pommel portion 12P. At least one of the power supply PS1 and the electrical switch SW1 is disposed in the upper side US. At least one of the power supply PS1 and the electrical switch SW1 is disposed at the base member 12. At least one of the power supply PS1 and the electrical switch SW1 is disposed closer to the proximal portion 14A than to the distal portion 14B. At least one of the wireless communicator WC1 and the power supply PS1 is disposed at the pommel portion 12P. At least one of the wireless communicator WC1 and the power supply PS1 is disposed in the upper side US. At least one of the wireless communicator WC1 and the power supply PS1 is disposed at the base member 12. At least one of the wireless communicator WC1 and the power supply PS1 is disposed closer to the proximal portion 14A than to the distal portion 14B.

Further, the power supply PS1 is disposed closer to the second end 12B than the first pivot axis A1 when viewed from the first direction D1. That is, at least one of the wireless communicator WC1 and the power supply PS1 is disposed closer to the second end 12B than the first pivot axis A1 when viewed from the first direction D1 parallel to the first pivot axis A1. In other words, the power supply PS1 is disposed closer to the second end 12B than the hydraulic unit 22 when viewed from the first direction. That is, at least one of the wireless communicator WC1 and the power supply PS1 is disposed closer to the second end 12B than the hydraulic unit 22 when viewed from the first direction D1 parallel to the first pivot axis A1.

Conversely, at least one of the cylinder bore 24 and the piston 26 is at least partly disposed closer to the first end 12A than the at least one of the wireless communicator WC1 and the power supply PS1 when viewed from the first direction D1. At least one of the cylinder bore 24, the piston 26, and the reservoir tank 32 is at least partly disposed closer to the first end 12A than the at least one of the wireless communicator WC1 and the power supply PS1 when viewed from the first direction D1. More specifically, at least one of the whole of the cylinder bore 24 and the whole of the piston 26 is disposed closer to the first end 12A than the at least one of the wireless communicator WC1 and the power supply PS1 when viewed from the first direction D1. At least one of the whole of the cylinder bore 24, the whole of the piston 26, and the whole of the reservoir tank 32 is disposed closer to the first end 12A than the at least one of the wireless communicator WC1 and the power supply PS1 when viewed from the first direction D1. However, the power supply PS1 may be disposed at a different place from the pommel portion 12P. Other possible positions are described in the modifications of this embodiment.

Further, at least part of the hydraulic unit 22 is disposed below at least one of the wireless communicator WC1 and the power supply PS1 when viewed from the first direction D1 parallel to the first pivot axis A1 in the mounting state of the bicycle operating device 10. Specifically, at least part of the hydraulic unit 22 is disposed below the power supply PS1 in the mounting state of the bicycle operating device 10. More specifically, at least one of the whole of the cylinder bore 24, the whole of the piston 26, and the whole of the reservoir tank 32 is disposed below the power supply PS1 when viewed from the first direction D1 in the mounting state of the bicycle operating device 10. Further specifically, the whole of the cylinder bore 24, the whole of the piston 26, and the whole of the reservoir tank 32 are disposed below the power supply PS1 when viewed from the first direction D1 in the mounting state of the bicycle operating device 10.

In other words, at least part of the hydraulic unit 22 is disposed closer to the free end 14FE of the operating member 14 than at least one of the wireless communicator WC1 and the power supply PS1 when viewed from the first direction D1. Specifically, at least part of the hydraulic unit 22 is disposed closer to the free end 14FE than the power supply PS1 when viewed from the first direction D1. More specifically, at least one of the whole of the cylinder bore 24, the whole of the piston 26, and the whole of the reservoir tank 32 is disposed closer to the free end 14FE than the power supply PS1 when viewed from the first direction D1. Further specifically, the whole of the cylinder bore 24, the whole of the piston 26, and the whole of the reservoir tank 32 are disposed closer to the free end 14FE than the power supply PS1 when viewed from the first direction D1.

The power supply PS1 is electrically connected to the wireless communicator WC1 to supply electrical power to the wireless communicator WC1. The bicycle operating device 10 further comprises a cable C2 electrically connecting between the wireless communicator WC1 and the power supply PS1. The cable C2 extends from the wireless communicator WC1 to the power supply PS1 along the operating member 14 and/or the additional operating member 34. In addition, the power supply PS1 is electrically connected to the electrical switches SW1 and SW2, the communication controller CC1, and the informing device INF1 to supply electrical power to the electrical switches SW1 and SW2, the communication controller CC1, and the informing device INF1.

As seen in FIG. 6, the power supply PS1 includes an electric-energy generation element EG1. In addition, the power supply PS1 may further include a rectifying circuit RC1. Further, the power supply PS1 may further include a capacitor CA1. The power supply PS1 may include a battery BT1 and a battery holder BH1. The battery BT1 is mounted in the battery holder BH1. Examples of the battery BT1 include a primary battery such as a lithium manganese dioxide battery, and a secondary battery such as a lithium-ion battery. In this embodiment, the battery BT1 is a primary button battery.

The electric-energy generation element EG1 can include a piezoelectric element. The electric-energy generation element EG1 generates electric energy (e.g., alternating current) using pressure and/or vibration of the piezoelectric element. For example, the piezoelectric element may be attached to the first electrical switch SW1, and the electric-energy generation element EG1 generates the electric energy using pressure and/or vibration caused by the press of the first electrical switch SW1. Alternatively or additionally, the piezoelectric element may be attached to at least one of the base member 12 and the operating member 14, and the electric-energy generation element EG1 generates the electric energy using pressure and/or vibration of the at least one of the base member 12 and the operating member 14, which is caused by a movement of the operating member 14 relative to the base member 12. Further alternatively or additionally, the piezoelectric element may be attached to at least one of the operating member 14, the additional operating member 34, and the second electrical switch SW2. The electric-energy generation element EG1 generates the electric energy using pressure and/or vibration of the at least one of the operating member 14, the additional operating member 34, and the second electrical switch SW2, which is caused by a movement of the additional operating member 34 relative to the operating member 14. The remaining electric energy generated by the electric-energy generation element EG1 can be charged to the capacitor CA1.

The rectifying circuit RC1 is connected to the electric-energy generation element EG1 to rectify the electric energy generated by the electric-energy generation element EG1. Since the electric-energy generation element EG1 and the rectifying circuit RC1 have been well known in the electronics field, they will not be described and/or illustrated in detail here for the sake of brevity.

Modification of First Embodiment

Figure 7:
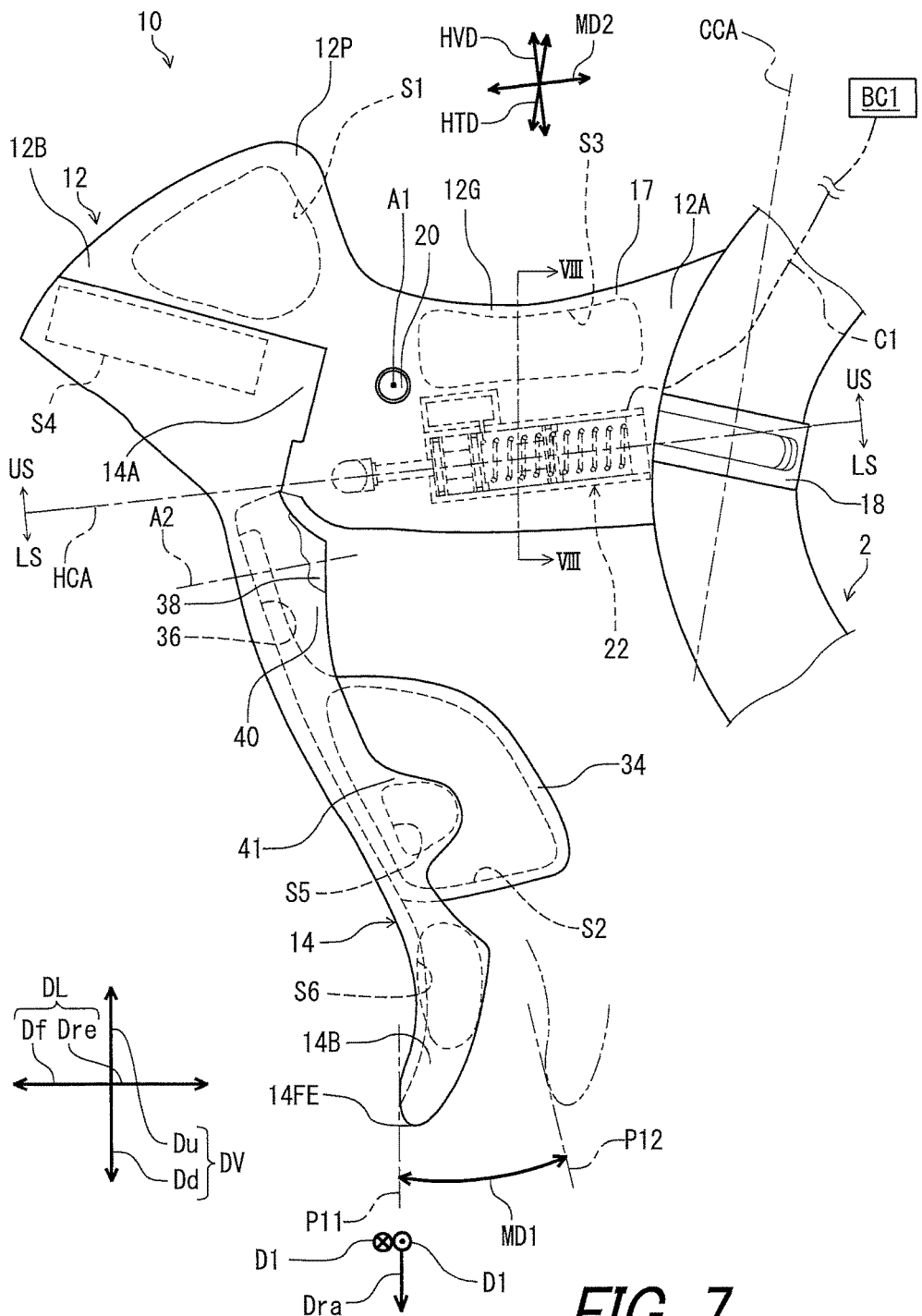
FIG. 7 shows other possible positions where at least one of an electrical switch, a wireless communicator, an informing device, a communication controller, and a power supply is disposed in the bicycle operating device illustrated in FIG. 1.

As described above, at least one of the electrical switches SW1 and SW2, the wireless communicator WC1, the informing device INF1, the communication controller CC1, the power supply PS1 may be disposed at a different position from a position described in the above embodiment. FIG. 7 shows possible positions where at least one of at least one of the electrical switches SW1 and SW2, the wireless communicator WC1, the informing device INF1, the communication controller CC1, the power supply PS1 may be disposed.

As seen in FIG. 7, the base member 12 includes the first internal space S1 and a third internal space S3. The third internal space S3 is disposed over the hydraulic unit 22 at the grip portion 12G when viewed from the first direction D1 in the mounting state of the bicycle operating device 10. The operating member 14 includes a fourth internal space S4, a fifth internal space S5, and sixth internal space S6. The fourth internal space S4 is disposed near the proximal portion 14A. The fifth internal space S5 is disposed at the receiving portion 41. The sixth internal space S6 is disposed near the distal portion 14B. Specifically, the fourth internal space S4 is disposed closer to the proximal portion 14A than to the distal portion 14B. The fifth internal space S5 overlaps with the second internal space S2 that the additional operating member 34 includes when viewed from the first direction D1. The sixth internal space S6 is closer to the distal portion 14B than to the proximal portion 14A.

The first internal space S1, the third internal space S3, and the fourth internal space S4 are disposed above at least part of the hydraulic unit 22 when viewed from the first direction D1 in the mounting state of the bicycle operating device 10. That is, at least part of the hydraulic unit 22 is disposed below each of the first internal space S1, the third internal space S3, and the fourth internal space S4. The first internal space S1, the third internal space S3, and the fourth internal space S4 are disposed farther from the free end 14FE of the operating member 14 than at least part of the hydraulic unit 22 when viewed from the first direction D1. That is, at least part of the hydraulic unit 22 is disposed closer to the free end 14FE of the operating member 14 than each of the first internal space S1, the third internal space S3, and the fourth internal space S4 when viewed from the first direction D1.

The first internal space S1, the third internal space S3, and the fourth internal space S4 are disposed in the upper side US.

Conversely, the second internal space S2, the fifth internal space S5, and the sixth internal space S6 are disposed below a whole of the hydraulic unit 22 when viewed from the first direction D1 in the mounting state of the bicycle operating device 10. The second internal space S2, the fifth internal space S5, and the sixth internal space S6 are disposed closer to the free end 14FE of the operating member 14 than at least part of the hydraulic unit 22 when viewed from the first direction D1. The second internal space S2, the fifth internal space S5, and the sixth internal space S6 are disposed in the lower side LS.

In the bicycle operating device 10 illustrated in FIG. 7, at least one of the wireless communicator WC1 and the power supply PS1 is disposed in at least one of the first internal space S1, the third internal space S3, and the fourth internal space S4. In a case where at least one power supply (e.g. the power supply PS1) is disposed in at least one of the first internal space S1, the third internal space S3, and the fourth internal space S4, as described in the first embodiment, any wireless communicator (e.g. the wireless communicator WC1) may be disposed in any of the first to sixth internal spaces S1 to S6. Further, in a case where at least one wireless communicator (e.g. the wireless communicator WC1) is disposed in at least one of the first internal space S1, the third internal space S3, and the fourth internal space S4 any power supply (e.g. the power supply PS1) may be disposed in any of the first to sixth internal spaces S1 to S6.

Figure 8:
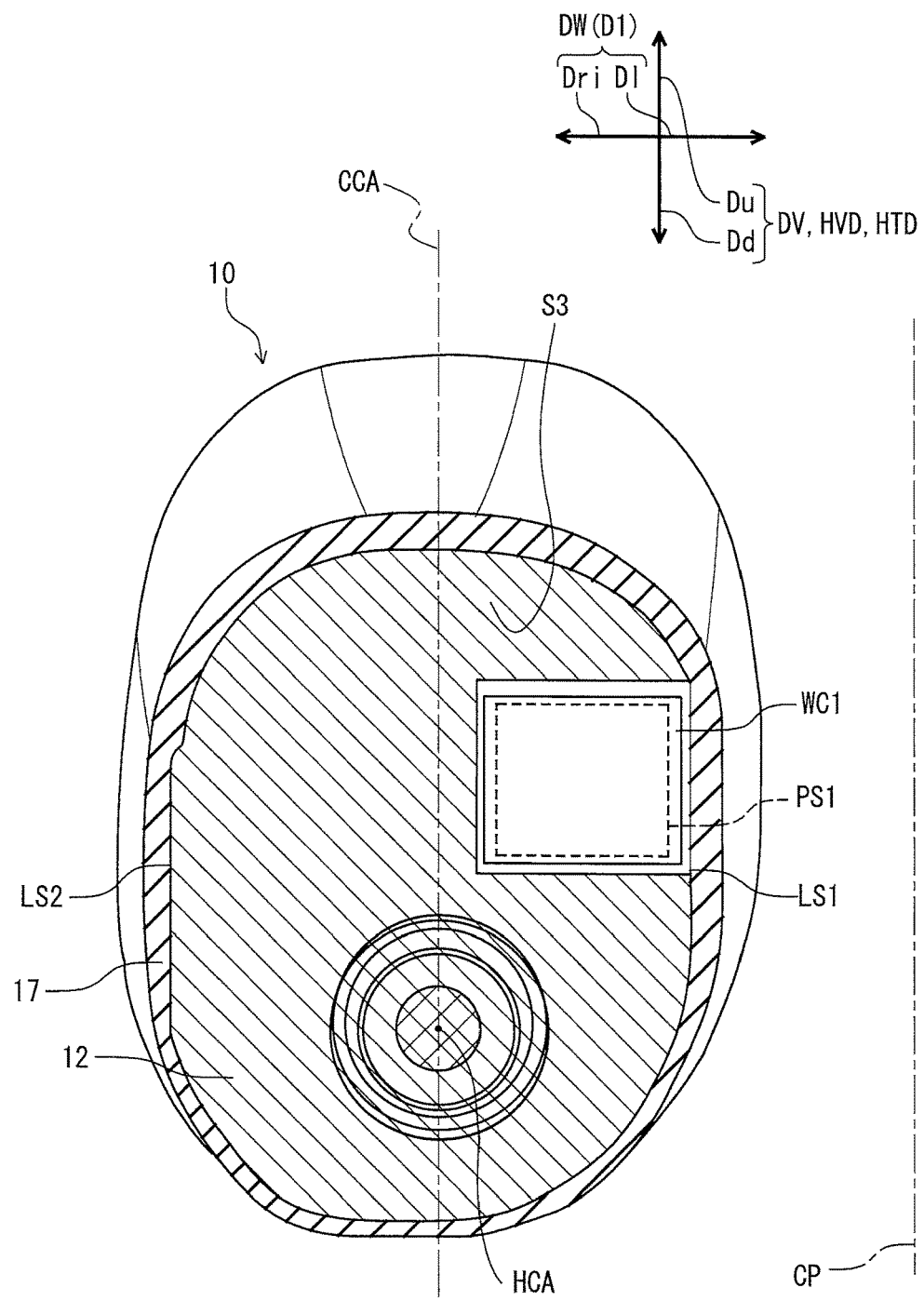
FIG. 8 is a cross-sectional view of an example of the bicycle operating device taken along line VIII-VIII of FIG. 7.
Figure 9:
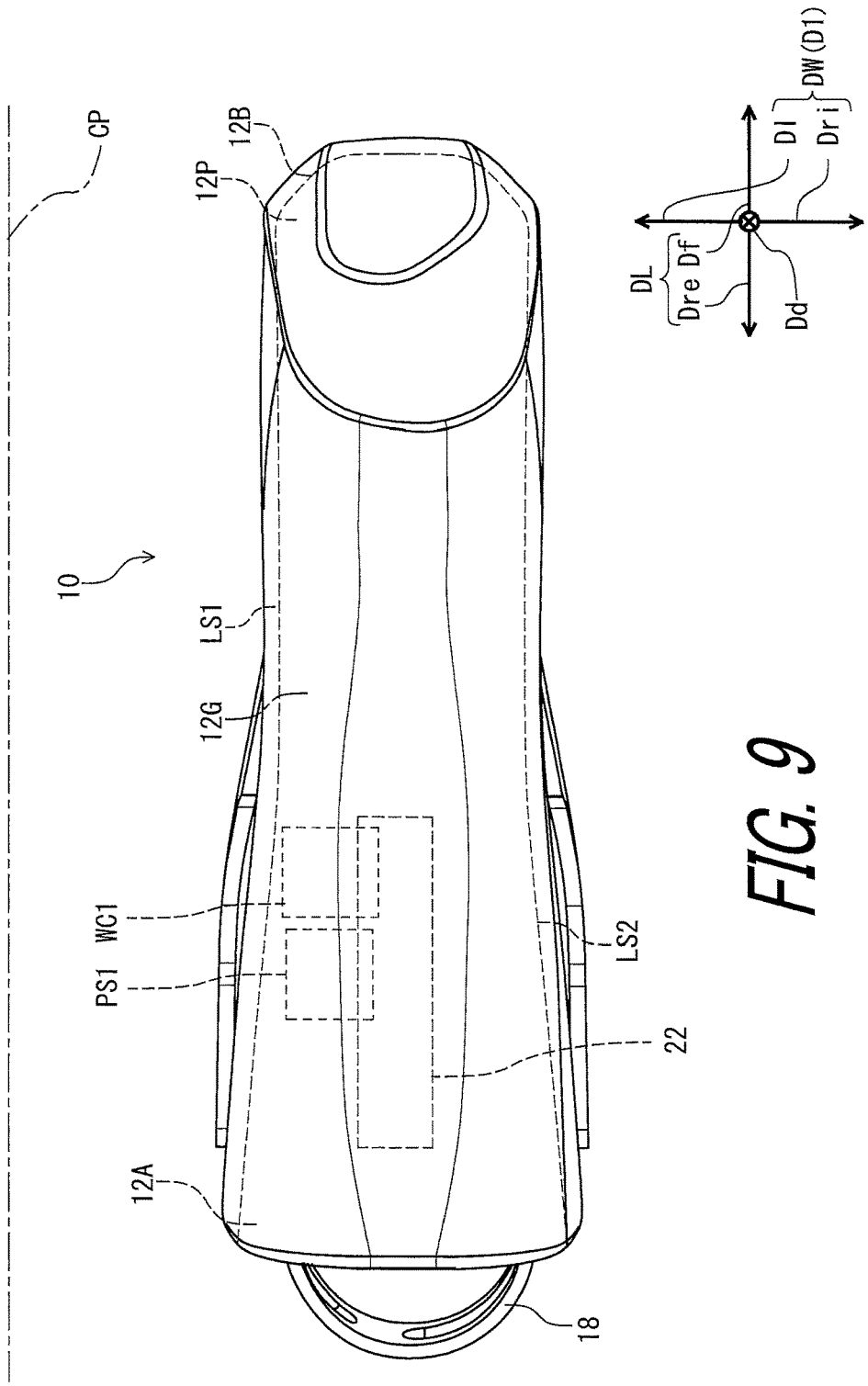
FIG. 9 is top view of the example of the bicycle operating device illustrated in FIG. 8.

In a case where the wireless communicator WC1 is disposed at the base member 12 (e.g. in the first internal space S1 or in the third internal space S3), the wireless communicator WC1 is preferably disposed to face toward the transverse center plane CP 2 (see FIG. 2). FIGS. 8 and 9 illustrate an example of the bicycle operating device 10 in which the wireless communicator WC1 is disposed in the third internal space S3. Specifically, FIG. 8 is a cross-sectional view of the example of the bicycle operating device 10 taken along line VIII-VIII of FIG. 7. FIG. 9 is a top view of the example of the bicycle operating device 10 as seen from the above in the mounting state of the bicycle operating device 10. In FIGS. 8 and 9, the power supply PS1 is also disposed in the third internal space S3, but the power supply PS1 may be disposed in one of the first, second, and fourth to sixth internal spaces S1, S2, and S4 to S6.

As seen in FIGS. 8 and 9, the first direction D1 is a bilateral direction including a first unilateral direction D1 (e.g. the leftward direction D1) and a second unilateral direction Dri (e.g. the rightward direction Dri). The second unilateral direction Dri is a reverse direction of the first unilateral direction D1. The base member 12 includes a first lateral surface LS1 and a second lateral surface LS2. The first lateral surface LS1 faces toward the first unilateral direction D1. The second lateral surface LS2 faces toward the second unilateral direction Dri. The first lateral surface LS1 is closer to the transverse center plane CP than the second lateral surface LS2 in the first direction D1. Preferably, the wireless communicator WC1 is disposed between the first lateral surface LS1 and the second lateral surface LS2 in the first direction D1. The first lateral surface LS1 is closer to the wireless communicator WC1 than the second lateral surface LS2 in the first direction D1.

Further, as seen in FIGS. 7 to 9, at least part of the hydraulic unit 22 overlaps with at least one of the wireless communicator WC1 and the power supply PS1 when viewed from the above in the mounting state of the bicycle operating device 10. Similarly, at least part of the hydraulic unit 22 overlaps with at least one of the wireless communicator WC1 and the power supply PS1 when viewed from a handle tangential direction HTD parallel to the clamp center axis CCA. At least part of the hydraulic unit 22 overlaps with at least one of the wireless communicator WC1 and the power supply PS1 when viewed from a hydraulic unit based vertical direction HVD perpendicular to the first pivot axis A1 and the hydraulic unit center axis HCA. Accordingly, it is possible to make at least one of the base member 12 and the operating member 14 thin in the first direction D1. Therefore, a user can easily grip at least one of the base member 12 and the operating member 14.

In a case where the wireless communicator WC1 is disposed at the operating member 14, the wireless communicator WC1 is preferably disposed in the sixth internal space S6, because the sixth internal space S6 is closer to the additional component BC2 than the fourth and fifth internal spaces S4 and S5 to improve wireless communication performance. In this case, as described above, at least one power supply (e.g. the power supply PS1) is disposed in at least one of the first internal space S1, the third internal space S3, and the fourth internal space S4 such that the at least part of the hydraulic unit 22 is disposed below the power supply PS1 in the mounting state of the bicycle operating device 10.

The communication controller CC1 may be disposed in a different internal space (one of S2 to S6) from the first internal space S1. In a case where the bicycle operating device 10 comprises the plurality of communication controllers, plurality of communication controllers may be disposed in at least one of the first to sixth internal spaces S1 to S6. Further, at least one of the plurality of the communication controllers (e.g. the communication controller CC1) may be integrated into the wireless communicator WC1 as a single unit.

At least one of the electrical switches SW1 and SW2 may be disposed in at least one of the internal spaces S3 to S6 which are different from the first and second internal spaces S1 and S2. For example, the electrical switch SW2 may be disposed in the fifth internal space S5 of the receiving portion 41 in place of the second internal space S2. In this case, the electrical switch SW2 overlaps with the additional operating member 34 when viewed from the first direction D1. A button of the second electrical switch SW2 protrudes from the receiving portion 41. That is, the electrical switch SW2 is disposed to face the additional operating member 34 in the first direction D1. In this structure, the electrical switch SW2 is configured to be activated by the additional operating member 34 in response to the second input operation, which is described above.

Further, in a case where the power supply PS1 generates electric energy caused by the press of at least one of the electrical switches SW1 and SW2, the at least one of the electrical switches SW1 and SW2 may preferably be integrated into the power supply PS1. Alternatively, the at least one of the electrical switches SW1 and SW2 may preferably be disposed in an internal space in which the power supply PS1 is disposed.

The informing device INF1 is mounted to one of the base member 12, the operating member 14 and the additional operating member 34. In the illustrated embodiment, the informing device INF1 is mounted to the additional operating member 34. The informing device INF1 can be also mounted to one of the base member 12 and the operating member 14 if needed and/or desired. The informing device INF1 may be disposed in a different internal space (one of S1, S3 to S6) from the second internal space S2. Further, the informing device INF1 may be disposed in an apparatus mounted to the bicycle handlebar 2 which is different from the bicycle operating device 10 (e.g. a cycle computer). In a case where the bicycle operating device 10 comprises a plurality of informing devices, the plurality of informing devices may be disposed in at least one of the first to sixth internal spaces S1 to S6.

In a case where structures of the bicycle operating device 10 is applied to the left control device 11 which is shown in FIG. 2, the left control device 11 has substantially the same constructions as those of bicycle operating device 10, except that they are mirror images of each other, they will not be described and/or illustrated in detail here for the sake of brevity.

Second Embodiment

Figure 10:
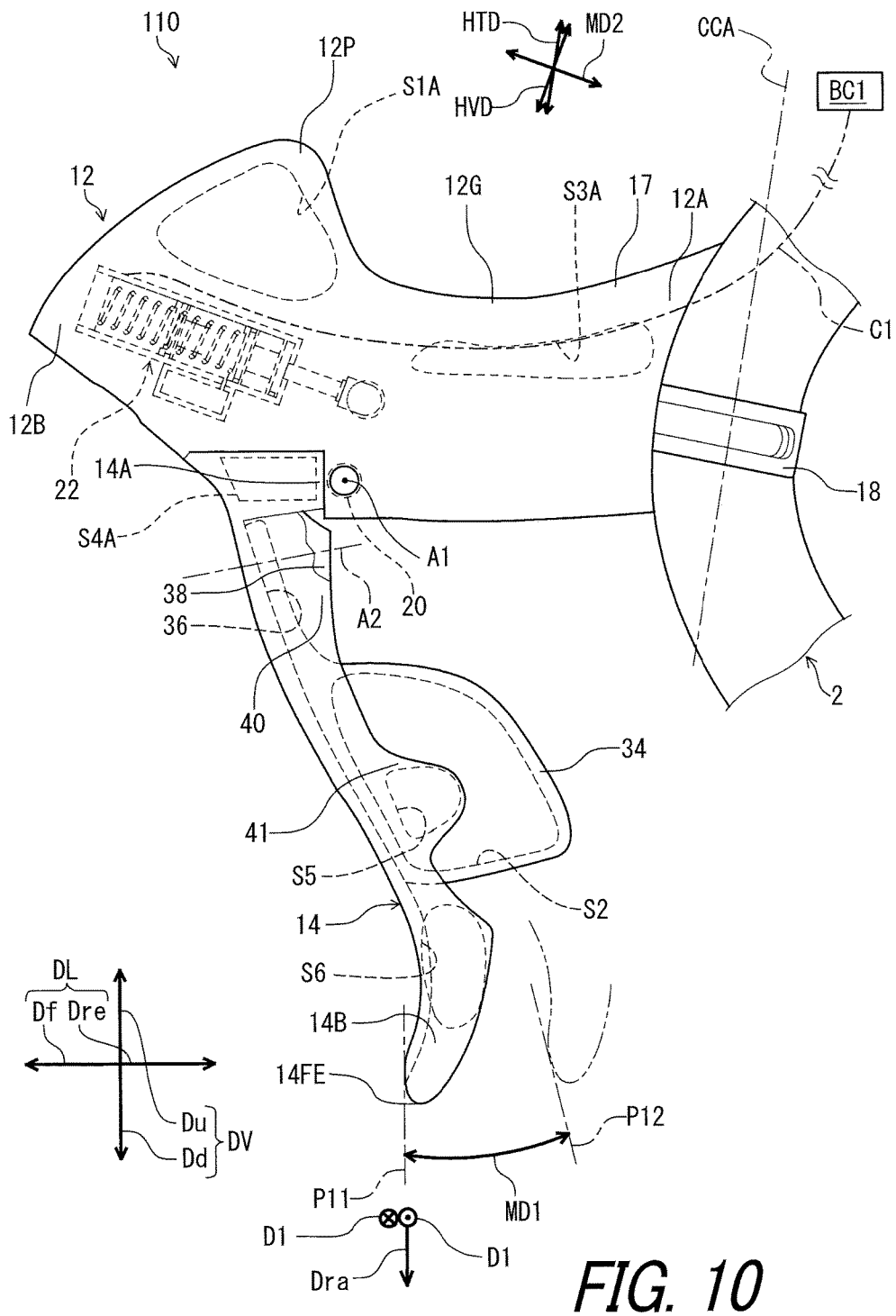
FIG. 10 is a left side elevational view of a bicycle handle provided with a bicycle operating device in accordance with a second embodiment.
Figure 11:
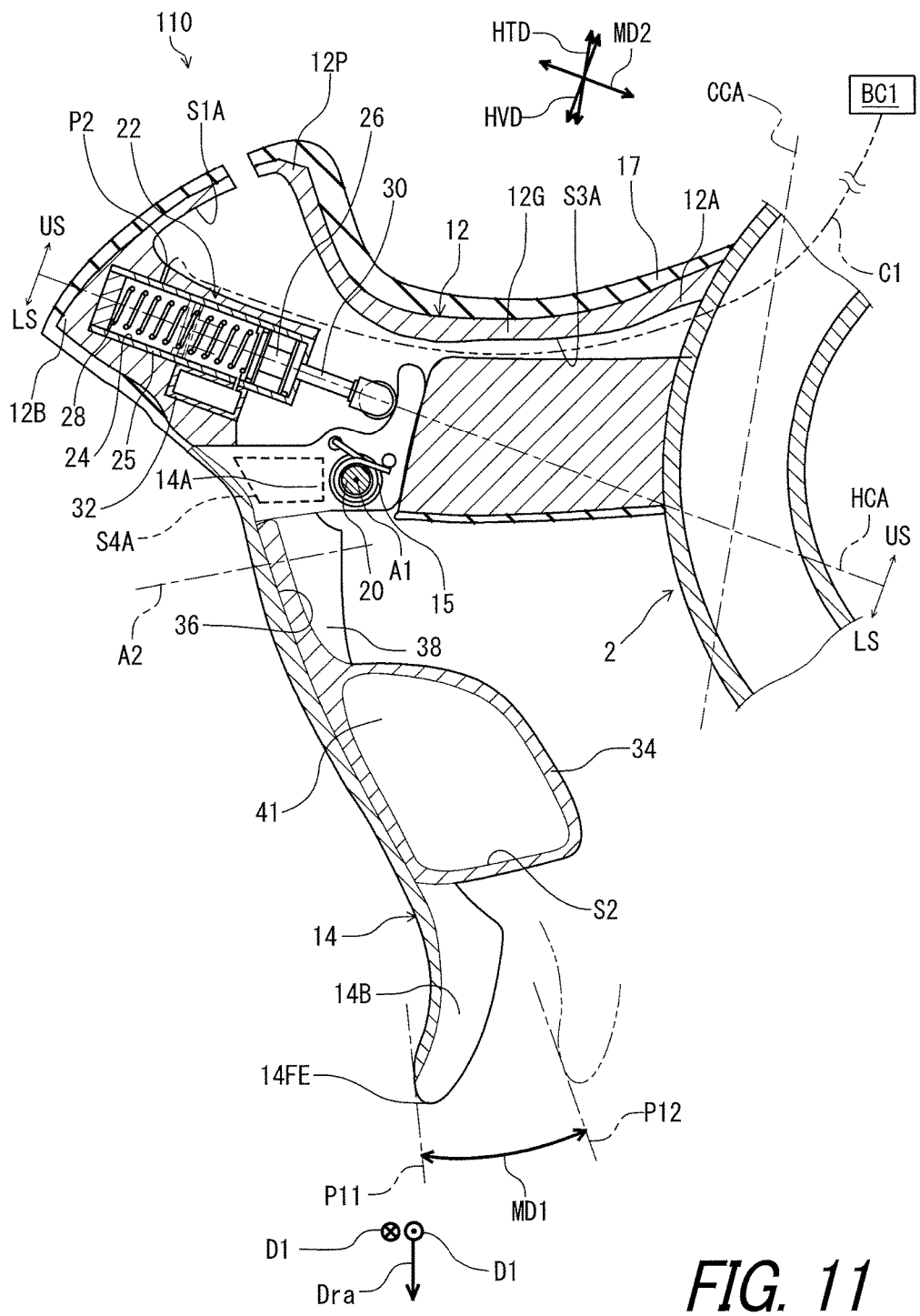
FIG. 11 is a cross-sectional view of the bicycle operating device illustrated in FIG. 10.

A bicycle operating device 110 in accordance with a second embodiment will be described below referring to FIGS. 10 and 11. The bicycle operating device 110 has the same configuration as the bicycle operating device 10 except for a position of the hydraulic unit 22, a shape of a third internal space S3A in the base member 12, a positional relationship between a first internal space S1A and the hydraulic unit 22, a positional relationship between the third internal space S3A and the hydraulic unit 22, and a positional relationship between a fourth internal space S4A and the hydraulic unit 22. Thus, elements having substantially the same function as those in the first embodiment will be numbered the same here, and will not be described and/or illustrated again in detail here for the sake of brevity.

In the second embodiment, the hydraulic unit 22 is disposed under the pommel portion 12P in the base member 12 when viewed from the first direction D1 in the mounting state of the bicycle operating device 110. The hydraulic unit 22 is disposed over the operating member 14 when viewed from the first direction D1 in the mounting state of the bicycle operating device 110. At least part of the hydraulic unit 22 is disposed above the first pivot axis A1 when viewed from the first direction D1 in the mounting state of the bicycle operating device 110. Specifically, at least one of a whole of the cylinder bore 24, a whole of the piston 26, and a whole of the reservoir tank 32 is disposed above the first pivot axis A1 when viewed from the first direction D1 in the mounting state of the bicycle operating device 110. More specifically, the whole of the cylinder bore 24, the whole of the piston 26, and the whole of the reservoir tank 32 are disposed above the first pivot axis A1 when viewed from the first direction D1 in the mounting state of the bicycle operating device 110.

Further, at least part of the hydraulic unit 22 is disposed closer to the second end 12B than the first pivot axis A1 when viewed from the first direction D1 parallel to the first pivot axis A1. Specifically, at least one of the cylinder bore 24, the piston 26, and the reservoir tank 32 is at least partly disposed closer to the second end 12B than the first pivot axis A1 when viewed from the first direction D1. More specifically, at least one of the whole of the cylinder bore 24, the whole of the piston 26, and the whole of the reservoir tank 32 is disposed closer to the second end 12B than the first pivot axis A1 when viewed from the first direction D1. An outlet port P2 of the hydraulic unit 22 is closer to the second end 12B than the piston 26 when viewed from the first direction D1.

The first internal space S1A is disposed over at least part of the hydraulic unit 22 when viewed from the first direction D1 in the mounting state of the bicycle operating device 110. That is, at least part of the hydraulic unit 22 is disposed below the first internal space S1A. The third internal space S3A is shaped differently from the third internal space S3 in the first embodiment such that at least part of the hydraulic unit 22 is disposed below the third internal space S3A. The fourth internal space S4A is disposed below the whole of the hydraulic unit 22 when viewed from the first direction D1 in the mounting state of the bicycle operating device 110.

Accordingly, the first internal space S1A and the third internal space S3A are disposed farther from the free end 14FE of the operating member 14 than at least part of the hydraulic unit 22 when viewed from the first direction D1. That is, at least part of the hydraulic unit 22 is disposed closer to the free end 14FE of the operating member 14 than each of the first internal space S1A and the third internal space S3A when viewed from the first direction D1. Further, the fourth internal space S4A is disposed closer to the free end 14FE of the operating member 14 than at least part of the hydraulic unit 22 when viewed from the first direction D1. The first internal space S1A and the third internal space S3A are disposed in the upper side US. Conversely, the fourth internal space S4A is disposed in the lower side LS.

Therefore, in the second embodiment, at least one of the wireless communicator WC1 and the power supply PS1 is disposed in at least one of the first internal space S1A and the third internal space S3A. In a case where at least one power supply (e.g. the power supply PS1) is disposed in at least one of the first internal space S1A and the third internal space S3A, any wireless communicator (e.g. the wireless communicator WC1) may be disposed in any of the first to sixth internal spaces S1A to S6. Conversely, in a case where at least one wireless communicator (e.g. the wireless communicator WC1) is disposed in at least one of the first internal space S1A and the third internal space S3A, any power supply (e.g. the power supply PS1) may be disposed in any of the first to sixth internal spaces S1A to S6. Other features are the same as those in the first embodiment.

Third Embodiment

A bicycle operating device 210 in accordance with a third embodiment will be described below referring to FIGS. 12 and 13. The bicycle operating device 210 has the same configuration as the bicycle operating device 10 except for a hydraulic unit 122, a position of the first pivot shaft 20, a pivot pin 142, an operating member 114, an additional operating member 134, a shape of a third internal space S3B in the base member 12, a shape of a fourth internal space S4B in the operating member 114, a positional relationship between a first internal space S1B and the hydraulic unit 122, and a positional relationship between the third internal space S3B and the hydraulic unit 122. Thus, elements having substantially the same function as those in the above embodiments will be numbered the same here, and will not be described and/or illustrated again in detail here for the sake of brevity.

Figure 12:
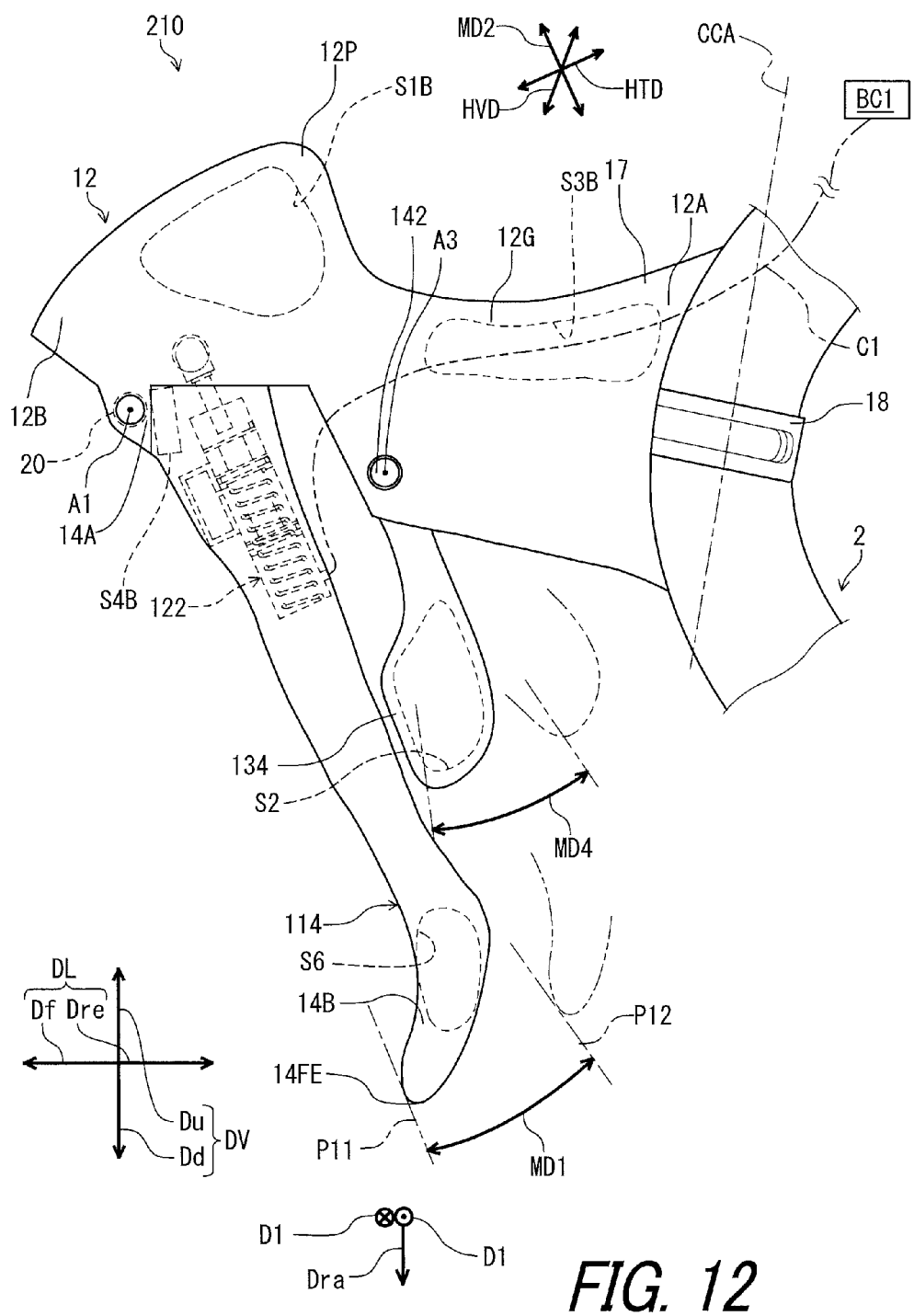
FIG. 12 is a left side elevational view of a bicycle handle provided with a bicycle operating device in accordance with a third embodiment.
Figure 13:
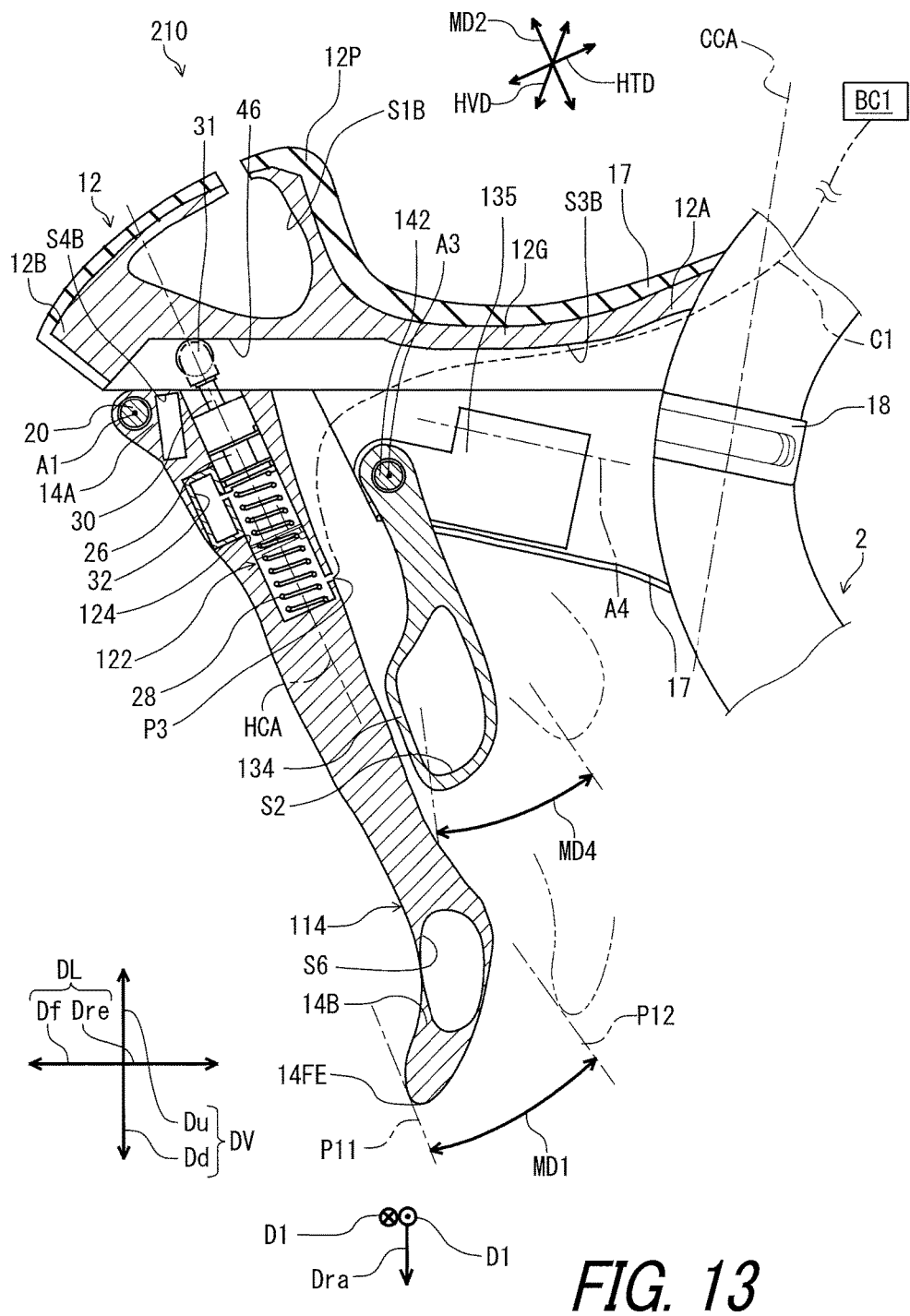
FIG. 13 is a cross-sectional view of the bicycle operating device illustrated in FIG. 12.

As seen in FIGS. 12 and 13, the bicycle operating device 210 in the third embodiment includes an operating member 114 which includes the hydraulic unit 122. In this embodiment, the first pivot axis A1 (the first pivot shaft 20) is arranged at a front portion of the operating member 114 when viewed from the first direction D1 in the mounting state of the bicycle operating device 210. The first pivot axis A1 is arranged closer to the second end 12B than to the pommel portion 12P when viewed from the first direction D1. As seen in FIG. 13, the hydraulic unit 122 comprises a cylinder bore 124 and the piston 26. The hydraulic unit 122 comprises a reservoir tank 32 connected to the cylinder bore 124. As seen in FIG. 13, the cylinder bore 124 is shaped as a hole in the operating member 114. However, the cylinder bore 124 may be defined by a hydraulic cylinder which is provided in the operating member 114 and which is a different member from the operating member 114. Further, the reservoir tank 32 may be integrated into the cylinder bore 124.

The hydraulic unit 122 is disposed behind the first pivot shaft 20 when viewed from the first direction D1 in the mounting state of the bicycle operating device 210. That is, at least part of the hydraulic unit 122 is disposed closer to the first end 12A than the first pivot axis A1 when viewed from the first direction D1. Specifically, a whole of the hydraulic unit 122 is disposed closer to the first end 12A than the first pivot axis A1 when viewed from the first direction D1. The first pivot axis A1 is disposed closer to the second end 12B than at least part of the hydraulic unit 122.

At least part of the hydraulic unit 122 is disposed above the first pivot axis A1 when viewed from the first direction D1 in the mounting state of the bicycle operating device 210. Specifically, in the illustrated embodiment, a part of the connecting rod 30 is disposed above the first pivot axis A1 when viewed from the first direction D1 in the mounting state of the bicycle operating device 210. However, another part of the hydraulic unit 122 may be disposed above the first pivot axis A1.

In the third embodiment, the base member 12 includes an operating member actuating surface 46 under the first internal space S1B. The operating member actuating surface 46 pushes a top end 31 of the connecting rod 30 toward the distal portion 14B of the operating member 114 when the operating member 114 is operated to move from the rest position P11 toward the operated position P12. An outlet port P3 of the hydraulic unit 122 is disposed closer to the distal portion 14B of the operating member 114 than the piston 26.

In the illustrated embodiment, the additional operating member 134 is movably coupled to the base member 12. The additional operating member 134 does not overlap with the operating member 114 when viewed from the first direction D1. Accordingly, the operating member 114 does not include the receiving portion 41 and the fifth internal space S5.

As seen in FIG. 13, the additional operating member 134 is pivotally mounted to the base member 12 via a rotational mechanism 135. The additional operating member 134 is rotatable about a third pivot axis A3 which is parallel to the first pivot axis A1. The additional operating member 134 is rotatable about the third pivot axis A3 in a fourth movable direction MD4 to accommodate the pivoting of the operating member 114. In this embodiment, the fourth movable direction MD4 is a circumferential direction defined about the third pivot axis A3. The bicycle operating device 210 includes a pivot pin 142 defining the third pivot axis A3. The pivot pin 142 is secured to the rotational mechanism 135. The additional operating member 134 is pivotally mounted to the rotational mechanism 135 via the pivot pin 142.

The rotational mechanism 135 is pivotally mounted to the base member 12 about a fourth pivot axis A4 which is non-parallel to the first pivot axis A1. Accordingly, the additional operating member 134 is rotatable about a fourth pivot axis A4. The rotational mechanism 135 may have the same structure as a structure which the additional operating member 34 and the electrical switch SW2 in the first embodiment constitute and which is illustrated in FIG. 5. In a case where the rotational mechanism 135 may have the same structure as a structure which the additional operating member 34 and the electrical switch SW2 in the first embodiment constitute, the electrical switch SW2 in the rotational mechanism 135 is electrically connected to the wireless communicator WC1. Alternatively, the rotational mechanism 135 may have a rotational structure that a conventional shift unit has. For example, the rotational mechanism 135 may have a gear rotatable about the fourth pivot axis A4, a latch to position a rotational angle of the gear, and a rotation sensor to detect the rotation angle of the gear. The rotational mechanism 135 may further include a biasing member like the second biasing member 44 to bias the additional operating member 134 toward a specific position (e.g. a rest position or an original position).

When the additional operating member 134 is pushed by a user substantially along the first direction D1 which is parallel to the third pivot axis A3, the additional operating member 134 pivots relative to the base member 12 about the fourth pivot axis A4 toward an operated position which is not shown in the drawings. Such pivotal movement of the additional operating member 134 relative to the base member 12 can be referred to as the second input operation. The rotational mechanism 135 is configured to receive the second input operation from a user to generate a second control signal SG2 in response to the second input operation.

As seen in FIG. 13, the first internal space S1B is disposed over at least part of the hydraulic unit 122 when viewed from the first direction D1 in the mounting state of the bicycle operating device 210. That is, at least part of the hydraulic unit 122 is disposed below the first internal space S1B. The third internal space S3B is shaped differently from the third internal space S3 in the first embodiment such that at least part of the hydraulic unit 122 is disposed below the third internal space S3B. The fourth internal space S4B is shaped differently from the fourth internal space S4 in the first embodiment such that at least part of the hydraulic unit 122 is disposed below the fourth internal space S4B. The fourth internal space S4B is disposed closer to the first pivot axis A1 than the hydraulic unit 122 when viewed from the first direction D1. The fourth internal space S4B is disposed closer to the proximal portion 14A than to the distal portion 14B.

Accordingly, the first internal space S1B, the third internal space S3B, and the fourth internal space S4B are disposed farther from the free end 14FE of the operating member 114 than at least part of the hydraulic unit 122 when viewed from the first direction D1. That is, at least part of the hydraulic unit 122 is disposed closer to the free end 14FE of the operating member 114 than each of the first internal space S1B, the third internal space S3B, and the fourth internal space S4B when viewed from the first direction D1. Further, the second internal space S2 and the sixth internal space S6 are disposed closer to the free end 14FE of the operating member 114 than at least part of the hydraulic unit 122 when viewed from the first direction D1.

Therefore, in the third embodiment, at least one of the wireless communicator WC1 and the power supply PS1 is disposed in at least one of the first internal space S1B, the third internal space S3B, and the fourth internal space S4B. In a case where at least one power supply (e.g. the power supply PS1) is disposed in at least one of the first internal space S1B, the third internal space S3B, and the fourth internal space S4B, any wireless communicator (e.g. the wireless communicator WC1) may be disposed in any of the first to fourth and the sixth internal spaces S1B to S4B and S6. Conversely, in a case where at least one wireless communicator (e.g. the wireless communicator WC1) is disposed in at least one of the first internal space S1B, the third internal space S3B, and the fourth internal space S4B, any power supply (e.g. the power supply PS1) may be disposed in any of the first to fourth and the sixth internal spaces S1B to S4B and S6. Other features are the same as those in the first embodiment.

It will be apparent to those skilled in the bicycle field from the present disclosure that the above embodiments can be at least partially combined with each other.

In the present application, the term "comprising" and its derivatives, as used herein, are intended to be open ended terms that specify the presence of the stated features, elements, components, groups, integers, and/or step, but do not exclude the presence of other unstated features, elements, components, groups, integers and/or step. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
a base member including a first end to be mounted to a bicycle handlebar and a second end opposite to the first end;
an operating member pivotally coupled to the base member about a first pivot axis;
a hydraulic unit coupled to the operating member to operate a bicycle component in response to an operation of the operating member;
an electrical switch to be activated by an input operation from a user;
a wireless communicator electrically connected to the electrical switch to wirelessly transmit a signal to an additional component in response to the input operation; and
a power supply electrically connected to the wireless communicator to supply electrical power to the wireless communicator, at least part of the hydraulic unit being disposed below the power supply when viewed from a first direction parallel to the first pivot axis in a mounting state of the bicycle operating device.

2. The bicycle operating device according to claim 1, wherein
the at least part of the hydraulic unit overlaps with the at least one of the wireless communicator and the power supply when viewed from the above in the mounting state of the bicycle operating device.

3. The bicycle operating device according to claim 1, further comprising:
a mounting clamp to be coupled to the bicycle handlebar, the mounting clamp having an annular shape, the annular shape having a clamp center axis, wherein
the at least part of the hydraulic unit overlaps with the at least one of the wireless communicator and the power supply when viewed from a handle tangential direction parallel to the clamp center axis.

4. The bicycle operating device according to claim 1, wherein
the hydraulic unit has a hydraulic unit center axis, and
the at least part of the hydraulic unit overlaps with the at least one of the wireless communicator and the power supply when viewed from a hydraulic unit based vertical direction perpendicular to the first pivot axis and the hydraulic unit center axis.

5. The bicycle operating device according to claim 4, wherein
the hydraulic unit comprises:
a cylinder bore having a center axis defining the hydraulic unit center axis; and
a piston movably provided in the cylinder bore, the piston being configured to move in a direction in which the hydraulic unit center axis extends.

6. The bicycle operating device according to claim 1, wherein
the hydraulic unit comprises:
a cylinder bore; and
a piston movably provided in the cylinder bore.

7. The bicycle operating device according to claim 1, wherein
the hydraulic unit comprises:
a cylinder bore;
a piston movably provided in the cylinder bore; and
a reservoir tank connected to the cylinder bore.

8. The bicycle operating device according to claim 1, wherein
the at least part of the hydraulic unit is disposed below the first pivot axis when viewed from the first direction in the mounting state of the bicycle operating device.

9. The bicycle operating device according to claim 8, wherein
the at least part of the hydraulic unit is disposed within the base member.

10. The bicycle operating device according to claim 8, wherein
the at least part of the hydraulic unit is disposed at the operating member.

11. The bicycle operating device according to claim 1, wherein
the bicycle operating device is configured to be mounted on a bicycle having a transverse center plane,
the base member includes a first lateral surface and a second lateral surface, the wireless communicator being disposed between the first lateral surface and the second lateral surface in the first direction, the first lateral surface being closer to the wireless communicator than the second lateral surface in the first direction, and
the first lateral surface is disposed closer to the transverse center plane than the second lateral surface in the first direction.

12. The bicycle operating device according to claim 1, wherein
the base member includes a mounting surface at the first end, the mounting surface having a curved shape corresponding to a drop-down handlebar.

13. The bicycle operating device according to claim 1, wherein
the base member includes a grip portion arranged between the first end and the second end.

14. The bicycle operating device according to claim 1, wherein
the base member includes a pommel portion at the second end.

15. The bicycle operating device according to claim 1, wherein
at least one of the wireless communicator and the power supply is disposed at the base member.

16. The bicycle operating device according to claim 1, further comprising:
a first pivot shaft pivotally coupling the operating member to the base member about the first pivot axis, wherein
the operating member includes a proximal portion connected to the first pivot shaft and a distal portion opposite to the proximal portion in a radial direction around the first pivot axis shaft, and
at least one of the wireless communicator and the power supply is disposed closer to the proximal portion than to the distal portion.

17. A bicycle operating device comprising:
a base member including a first end to be mounted to a bicycle handlebar and a second end opposite to the first end;
an operating member pivotally coupled to the base member about a first pivot axis;
a hydraulic unit coupled to the operating member to operate a bicycle component in response to an operation of the operating member;
an electrical switch to be activated by an input operation from a user;
a wireless communicator electrically connected to the electrical switch to wirelessly transmit a signal to an additional component in response to the input operation; and
a power supply electrically connected to the wireless communicator to supply electrical power to the wireless communicator, at least part of the hydraulic unit being disposed below the power supply when viewed from a first direction parallel to the first pivot axis in a mounting state of the bicycle operating device, wherein
the wireless communicator is disposed at the operating member.

18. A bicycle operating device comprising:
a base member including a first end to be mounted to a bicycle handlebar and a second end opposite to the first end;
an operating member pivotally coupled to the base member about a first pivot axis;
an additional operating member movably mounted to the base member;
a hydraulic unit coupled to the operating member to operate a bicycle component in response to an operation of the operating member;
an electrical switch to be activated by an input operation from a user;
a wireless communicator electrically connected to the electrical switch to wirelessly transmit a signal to an additional component in response to the input operation; and
a power supply electrically connected to the wireless communicator to supply electrical power to the wireless communicator, at least part of the hydraulic unit being disposed below the power supply when viewed from a first direction parallel to the first pivot axis in a mounting state of the bicycle operating device, wherein
the wireless communicator is disposed at the additional operating member.

19. The bicycle operating device according to claim 18, wherein
the additional operating member is movably coupled to the operating member.

20. A bicycle operating device comprising:
a base member including a first end to be mounted to a bicycle handlebar and a second end opposite to the first end, the base member including a pommel portion at the second end;
an operating member pivotally coupled to the base member about a first pivot axis;
a hydraulic unit coupled to the operating member to operate a bicycle component in response to an operation of the operating member;
an electrical switch to be activated by an input operation from a user;
a wireless communicator electrically connected to the electrical switch to wirelessly transmit a signal to an additional component in response to the input operation; and
a power supply electrically connected to the wireless communicator to supply electrical power to the wireless communicator, at least part of the hydraulic unit being disposed below at least one of the wireless communicator and the power supply when viewed from a first direction parallel to the first pivot axis in a mounting state of the bicycle operating device, wherein
at least one of the power supply and the electrical switch is disposed at the pommel portion.

* * * * *